United States Patent
Chen et al.

(10) Patent No.: US 10,812,231 B2
(45) Date of Patent: Oct. 20, 2020

(54) ENHANCED COORDINATED MULTIPOINT OPERATION

(71) Applicant: QUALCOMM Incorporated, San Diego, CA (US)

(72) Inventors: Wanshi Chen, San Diego, CA (US); Peter Gaal, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 15/461,298

(22) Filed: Mar. 16, 2017

(65) Prior Publication Data

US 2017/0272220 A1   Sep. 21, 2017

Related U.S. Application Data

(60) Provisional application No. 62/310,322, filed on Mar. 18, 2016.

(51) Int. Cl.
  *H04L 5/00* (2006.01)
  *H04L 1/00* (2006.01)
  (Continued)

(52) U.S. Cl.
  CPC ........... *H04L 5/0035* (2013.01); *H04B 7/024* (2013.01); *H04B 7/0413* (2013.01);
  (Continued)

(58) Field of Classification Search
  CPC ..... H04B 7/024; H04B 7/0413; H04L 5/0035; H04W 72/042
  See application file for complete search history.

(56) References Cited

U.S. PATENT DOCUMENTS

2014/0321370 A1   10/2014   Chen et al.
2015/0222400 A1*  8/2015   Xiong .................. H04L 1/0026
                                                             370/329
(Continued)

OTHER PUBLICATIONS

ISA/EP, International Search Report and Written Opinion of the International Searching Authority, Int'l Application No. PCT/US2017/022943, dated Jun. 26, 2017, European Patent Office, Rijswijk, NL, 19 pgs.

(Continued)

*Primary Examiner* — Hoon J Chung
(74) *Attorney, Agent, or Firm* — Holland & Hart LLP

(57) ABSTRACT

Methods, systems, and devices for wireless communication are described. A user equipment (UE) may use multiple-input multiple-output (MIMO) layer specific and codeword specific communication configurations to communicate with multiple base stations. For example, multiple base stations may be configured to provide coordinated multipoint (CoMP) transmissions to the UE. One or more of the base stations may transmit a set of communications configurations to the UE that includes at least one MIMO layer specific or codeword specific configuration. The UE may then receive a dynamic indication of which communication configuration to use during a specific time period. The UE may then communicate with one or more of the base stations using the indicated configuration during the specified time period.

30 Claims, 19 Drawing Sheets

(51) Int. Cl.
*H04B 7/0417* (2017.01)
*H04B 7/024* (2017.01)
*H04B 7/0456* (2017.01)
*H04B 7/0413* (2017.01)
*H04B 7/06* (2006.01)

(52) U.S. Cl.
CPC ......... *H04B 7/0417* (2013.01); *H04B 7/0486* (2013.01); *H04B 7/0617* (2013.01); *H04B 7/0626* (2013.01); *H04L 1/0026* (2013.01); *H04L 1/0027* (2013.01); *H04L 5/0048* (2013.01)

(56) References Cited

U.S. PATENT DOCUMENTS

| | | | | |
|---|---|---|---|---|
| 2015/0349940 | A1* | 12/2015 | Kim | H04J 11/0053 370/329 |
| 2015/0358962 | A1* | 12/2015 | Lee | H04W 72/0446 370/336 |
| 2016/0248561 | A1* | 8/2016 | Davydov | H04B 7/024 |
| 2017/0202014 | A1* | 7/2017 | Moon | H04B 7/0626 |

OTHER PUBLICATIONS

LG Electronics, "Signaling Details for Additional DMRS Ports," 3GPP TSG RAN WG1 Meeting #82bis, R1-155399, Malmo, Sweden, Oct. 5-9, 2015, 3 pgs., XP051002306, 3rd Generation Partnership Project.

ZTE, "Downlink Control Signaling for CoMP", 3GPP TSG RAN WG1 Meeting #70bis, R1-124626, San Diego, USA, Oct. 8-12, 2012, 7 pgs., XP050662487, 3rd Generation Partnership Project.

\* cited by examiner

ENHANCED COORDINATED MULTIPOINT OPERATION

CROSS REFERENCES

The present application for patent claims priority to U.S. Provisional Patent Application No. 62/310,322 by Chen, et al., entitled "Enhanced Coordinated Multipoint Operation," filed Mar. 18, 2016, assigned to the assignee hereof.

BACKGROUND

The following relates generally to wireless communication, and more specifically to enhanced coordinated multipoint (CoMP) operation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

In some cases, a UE may communicate with more than one base station using CoMP operations. However, in some systems joint transmission CoMP operations may be based on coherent transmissions from each base station. This may not be available for base stations that have a less than ideal backhaul, which can limit the usefulness of joint transmissions and reduce overall system throughput.

SUMMARY

A user equipment (UE) may use multiple-input multiple-output (MIMO) layer specific and codeword specific communication configurations to communicate with multiple base stations. For example, multiple base stations may be configured to provide coordinated multipoint (CoMP) transmissions to the UE. One or more of the base stations may transmit a set of communications configurations to the UE that includes at least one MIMO layer specific or codeword specific configuration. The UE may then receive a dynamic indication of which communication configuration to use during a specific time period. The UE may then communicate with one or more of the base stations using the indicated configuration during the specified time period.

A method of wireless communication is described. The method may include receiving a set of communication configurations associated with a plurality of base stations, wherein at least one of the set of communication configurations comprises a MIMO layer specific configuration or a codeword specific configuration, receiving an indication of a communication configuration from the set of communication configurations and communicating with at least one base station of the plurality of base stations using the communication configuration.

An apparatus for wireless communication is described. The apparatus may include means for receiving a set of communication configurations associated with a plurality of base stations, wherein at least one of the set of communication configurations comprises a MIMO layer specific configuration or a codeword specific configuration, means for receiving an indication of a communication configuration from the set of communication configurations and means for communicating with at least one base station of the plurality of base stations using the communication configuration.

Another apparatus is described. The apparatus may include a processor, memory in electronic communication with the processor, and instructions stored in the memory. The instructions may be operable to cause the processor to receive a set of communication configurations associated with a plurality of base stations, wherein at least one of the set of communication configurations comprises a MIMO layer specific configuration or a codeword specific configuration, receive an indication of a communication configuration from the set of communication configurations and communicate with at least one base station of the plurality of base stations using the communication configuration.

A non-transitory computer readable medium for wireless communication is described. The non-transitory computer-readable medium may include instructions to cause a processor to receive a set of communication configurations associated with a set of base stations, where at least one of the set of communication configurations comprises a MIMO layer specific configuration or a codeword specific configuration, receive an indication of a communication configuration from the set of communication configurations and communicate with at least one base station of the set of base stations using the communication configuration.

In some examples of the method, apparatus, or non-transitory computer-readable medium described above, the communication configuration comprises a channel state information (CSI) power offset configuration, a CSI subframe set configuration, a codebook restriction, a rate matching configuration, a quasi-colocation (QCL) indication, or any combination thereof.

In some examples of the method, apparatus, or non-transitory computer-readable medium described above, the rate matching configuration comprises a starting symbol for physical downlink shared channel (PDSCH) transmissions, an ending symbol for PDSCH transmissions, a multimedia broadcast multicast (MBMS) single frequency network (MBSFN) indication, a cell-specific reference signal (CRS) configuration, one or more non-zero power CSI reference signal (NZP CSI-RS) configurations, or any combination thereof.

Some examples of the method, apparatus, or non-transitory computer-readable medium described above may further include processes, features, means, or instructions for identifying a resource allocation for each of the set of base stations based on the communication configuration, where the communicating is based on the resource allocation.

Some examples of the method, apparatus, or non-transitory computer-readable medium described above may further include processes, features, means, or instructions for identifying a CSI-RS port configuration for the at least one base station based on the communication configuration. Some examples of the method, apparatus, or non-transitory computer-readable medium described above may further include processes, features, means, or instructions for transmitting a CSI report to the at least one base station, where the CSI report is based on the CSI-RS port configuration and the set of base stations.

In some examples of the method, apparatus, or non-transitory computer-readable medium described above, the CSI-RS port configuration is based on a number of receive ports for a UE and a number of transmit ports for the at least one base station. Some examples of the method, apparatus, or non-transitory computer-readable medium described above may further include processes, features, means, or instructions for generating an individual CSI report for the at least one base station based on the communication configuration, where the communication configuration is based on communication with a single base station. Some examples of the method, apparatus, or non-transitory computer-readable medium described above may further include processes, features, means, or instructions for transmitting the individual CSI report.

Some examples of the method, apparatus, or non-transitory computer-readable medium described above may further include processes, features, means, or instructions for generating a combined CSI report for each of the set of base stations based on the communication configuration, where the communication configuration is based on communication with the set of base stations. Some examples of the method, apparatus, or non-transitory computer-readable medium described above may further include processes, features, means, or instructions for transmitting the combined CSI report for each of the set of base stations.

Some examples of the method, apparatus, or non-transitory computer-readable medium described above may further include processes, features, means, or instructions for identifying a special subframe configuration for each of the set base stations based on the communication configuration, where the communicating is based on the special subframe configuration.

In some examples of the method, apparatus, or non-transitory computer-readable medium described above, the special subframe configuration comprises a demodulation reference signal (DMRS) pattern, and where the communicating is based on the DMRS pattern. In some examples of the method, apparatus, or non-transitory computer-readable medium described above, the communication configuration comprises an uplink (UL) configuration and a downlink (DL) configuration.

In some examples of the method, apparatus, or non-transitory computer-readable medium described above, the communication configuration comprises an enhanced physical downlink control channel (ePDCCH) configuration, and where the communicating is based on the ePDCCH configuration. In some examples of the method, apparatus, or non-transitory computer-readable medium described above, the ePDCCH configuration comprises one or more ePDCCH resource sets associated with the MIMO layer specific configuration or the codeword specific configuration.

In some examples of the method, apparatus, or non-transitory computer-readable medium described above, the set of base stations are coordinated according to a CoMP configuration that comprises a coordinated beamforming (CBF) mode, a dynamic point selection (DPS) mode, or a joint transmission (JT) mode, and where communicating is based on the CoMP configuration.

A method of wireless communication is described. The method may include transmitting a set of communication configurations associated with a plurality of base stations, wherein at least one of the set of communication configurations is based on a MIMO layer specific communication or a codeword specific communication, transmitting an indication of a communication configuration from the set of communication configurations and communicating with a UE using the communication configuration.

An apparatus for wireless communication is described. The apparatus may include means for transmitting a set of communication configurations associated with a plurality of base stations, wherein at least one of the set of communication configurations is based on a MIMO layer specific communication or a codeword specific communication, means for transmitting an indication of a communication configuration from the set of communication configurations and means for communicating with a UE using the communication configuration.

Another apparatus is described. The apparatus may include a processor, memory in electronic communication with the processor, and instructions stored in the memory. The instructions may be operable to cause the processor to transmit a set of communication configurations associated with a plurality of base stations, wherein at least one of the set of communication configurations is based on a MIMO layer specific communication or a codeword specific communication, transmit an indication of a communication configuration from the set of communication configurations and communicate with a UE using the communication configuration.

A non-transitory computer readable medium for wireless communication is described. The non-transitory computer-readable medium may include instructions to cause a processor to transmit a set of communication configurations associated with a set of base stations, where at least one of the set of communication configurations is based on a MIMO layer specific communication or a codeword specific communication, transmit an indication of a communication configuration from the set of communication configurations and communicate with a UE using the communication configuration.

In some examples of the method, apparatus, or non-transitory computer-readable medium described above, the communication configuration comprises a CSI power offset configuration, a CSI subframe set configuration, a codebook restriction, a rate matching configuration, a QCL indication, or any combination thereof.

In some examples of the method, apparatus, or non-transitory computer-readable medium described above, the rate matching configuration comprises a starting symbol for PDSCH transmissions, an ending symbol for PDSCH transmissions, an MBSFN indication, a CRS configuration, one or more NZP CSI-RS configurations, or any combination thereof.

Some examples of the method, apparatus, or non-transitory computer-readable medium described above may further include processes, features, means, or instructions for identifying a resource allocation for each of the set of base stations based on the communication configuration, where the communicating is based on the resource allocation. Some examples of the method, apparatus, or non-transitory computer-readable medium described above may further include processes, features, means, or instructions for identifying a CSI-RS port configuration based on the communication configuration. Some examples of the method, apparatus, or non-transitory computer-readable medium described above may further include processes, features, means, or instructions for receiving a CSI report based on the CSI-RS port configuration and set of base stations.

In some examples of the method, apparatus, or non-transitory computer-readable medium described above, the CSI-RS port configuration is based on a number of receive ports for a UE and a number of transmit ports. Some examples of the method, apparatus, or non-transitory computer-readable medium described above may further include processes, features, means, or instructions for receiving an individual CSI report based on the communication configuration, where the communication configuration is based on communication between a UE and a single base station.

Some examples of the method, apparatus, or non-transitory computer-readable medium described above may further include processes, features, means, or instructions for receiving a combined CSI report based on the communication configuration, where the communication configuration is based on communication with the set of base stations. Some examples of the method, apparatus, or non-transitory computer-readable medium described above may further include processes, features, means, or instructions for identifying a special subframe configuration based on the communication configuration, where the communicating is based on the special subframe configuration.

In some examples of the method, apparatus, or non-transitory computer-readable medium described above, the special subframe configuration comprises a DMRS pattern, and where the communicating is based on the DMRS configuration. In some examples of the method, apparatus, or non-transitory computer-readable medium described above, the communication configuration comprises an UL configuration and a DL configuration.

In some examples of the method, apparatus, or non-transitory computer-readable medium described above, the communication configuration comprises ePDCCH configuration, and where the communicating is based on the ePDCCH configuration. In some examples of the method, apparatus, or non-transitory computer-readable medium described above, the set of base stations are coordinated according to a CoMP configuration that comprises a CBF mode, a DPS mode, or a JT mode, and where communicating is based on the CoMP configuration.

DETAILED DESCRIPTION

Figure 1:
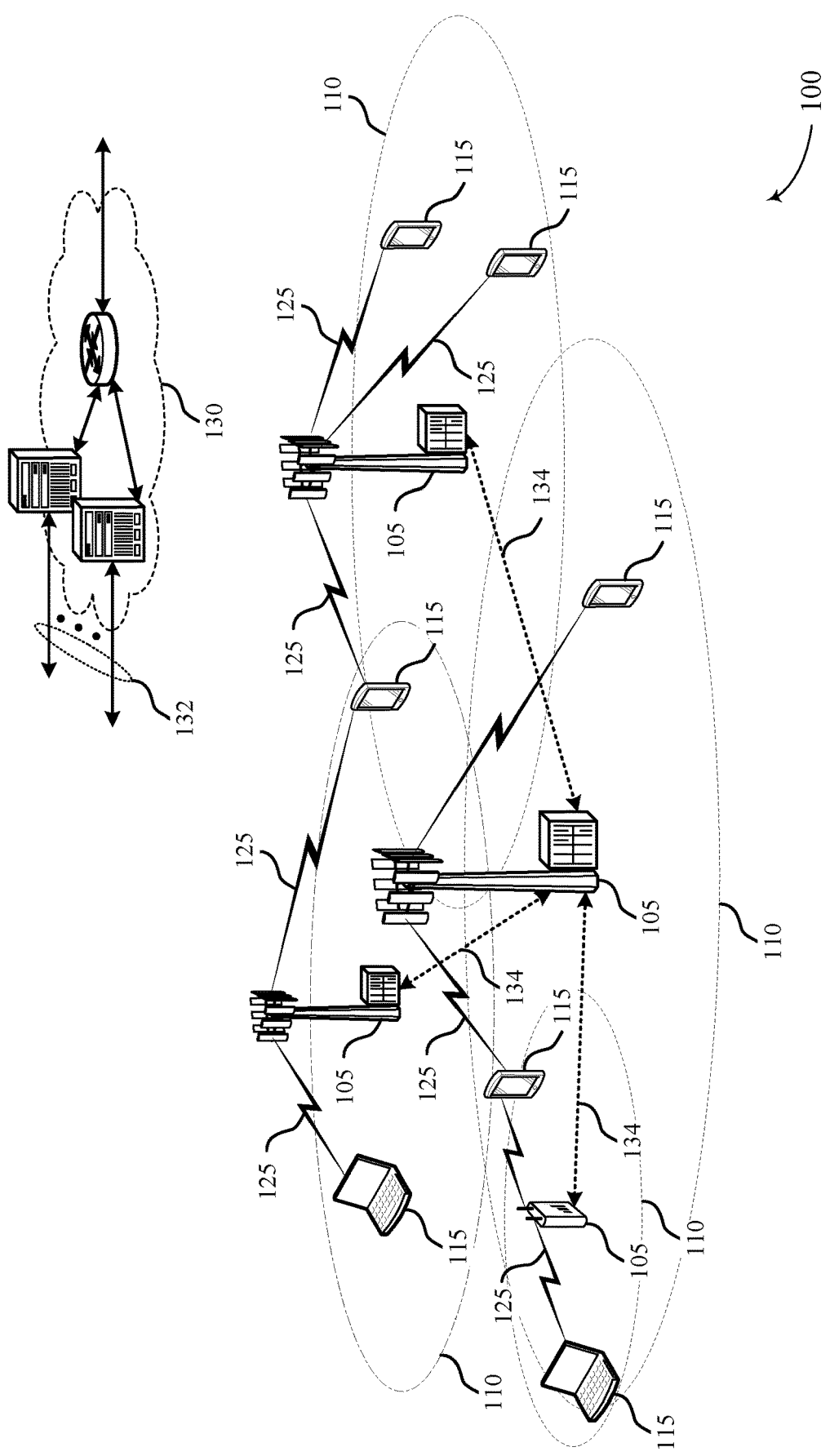
FIG. 1 illustrates an example of a wireless communications system that supports enhanced coordinated multipoint (CoMP) operation in accordance with aspects of the present disclosure.

Some wireless communications systems may use coordinated multi-point (CoMP) transmissions in which two or more base stations may transmit data to a user equipment (UE). Such CoMP transmissions may use several CoMP schemes, including dynamic point selection (DPS) in which different base stations transmit data to a UE at different times, joint transmission (JT) in which two or more base stations contemporaneously transmit data to a UE, and coordinated beamforming (CBF) in which two or more base stations coordinate signal transmissions that reduce interference between the two or more base stations and/or with nodes in adjacent cells.

When communicating using CoMP transmissions, base stations and UEs may use multiple-input multiple-output (MIMO) techniques, where multiple transmit and receive antennas are used for sending and receiving signals, respectively. For example, the UE may communicate with different base stations using different sets of MIMO communication layers. In some cases, each base station communicates with the UE using a different layer i.e., a layer specific communication configuration, and in other cases each base station may utilize multiple layers to transmit a codeword (or transport block), i.e., a codeword specific (or transport block specific) communication configuration.

Thus, a layer specific configuration may include transmitting different layers to a UE from different base stations or transmission points (TPs), where the number of base stations corresponds to the number of layers transmitted (e.g., eight base stations for eight layers, where each base station transmits one layer). A codeword specific configuration may utilize a pre-determined number of codewords (e.g., two codewords) for all transmission from multiple base stations. That is, a codeword specific configuration may incorporate multiple base stations in the transmission of the two codewords. In some cases, each base station communicates a single codeword at a time, and in some cases multiple TPs may jointly transmit a single codeword.

In some cases, various communication configurations may be dynamically indicated on a per-layer or per-codeword basis. These communication configurations may include one or more of a channel state information (CSI) power offset configuration, a CSI subframe set configuration, a codebook subset restriction, a rate matching configuration, and a quasi-co-location (QCL) indication. The indication of these communication configurations may enable a UE to perform channel feedback operations that are also layer or codeword specific. In some cases, the UE may report CSI to the base station regarding the quality of the signals received from each base station according to the layer or codeword specific configuration.

Aspects of the disclosure are initially described in the context of a wireless communication system. Further examples are then provided for wireless communications systems that support codeword specific and layer specific CoMP transmissions. Aspects of the disclosure are further illustrated by and described with reference to apparatus diagrams, system diagrams, and flowcharts that relate to enhanced CoMP operation.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Wireless communications system 100 may enable efficient CoMP transmissions using MIMO layer specific and codeword specific configurations.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Wireless communications system 100 may employ CoMP transmissions in which two or more TPs may transmit data to a UE 115. A TP may also be referred to as a base station 105 or a wireless node, and the terms may be used interchangeably. Such CoMP transmissions may use one or more CoMP schemes, including DPS in which different base stations transmit data to a UE 115 at different times, JT in which two or more base stations contemporaneously transmit data to a UE 115, and CBF in which two or more base stations coordinate signal transmissions that reduce interference between the two or more base stations and/or with nodes in adjacent cells. CoMP includes techniques for dynamic coordination of transmission and reception by a number of base stations 105 to improve overall transmission quality for UEs 115 as well as increasing network and spectrum utilization.

Base stations 105 and UEs 115 may use multiple-input multiple-output (MIMO) techniques, where multiple transmit and receive antennas are used to transmit and receive signals, respectively. MIMO techniques use multiple antennas on the base stations 105 or multiple antennas on the UE 115 to take advantage of multipath environments to transmit multiple data streams. A UE 115 may report channel information (e.g., channel state information (CSI)) to the base station regarding the quality of the signal received at each antenna. The base station 105 may accordingly use a rank indicator (RI) that is based on an antenna configuration associated with the number of antennas used.

When transmitting a signal, the base station 105 may convert a bit sequence of a codeword into modulation symbols and assign the modulation symbols to one or more transmission layers. The number of transmission layers may be associated with the number of antennas used for communication between the base station 105 and UE 115. For example, the number of layers may be less than or equal to the number of antennas, and a MIMO configuration may use at least two layers. While the techniques described herein reference the use and transmission of codewords, a codeword may also be referred to as a transport block (TB) and the terms may be interchangeable.

In some cases, MIMO transmissions may use a designated number of codewords that are associated with the number of layers. For example, two codewords may be used for transmissions of up to eight layers, such as a rank 8 transmission. In such cases, each codeword in the rank 8 transmission may include four layers. Each codeword may have a different modulation and coding scheme (MCS), new data indicator (NDI), and redundancy version (RV), but different layers corresponding to the same codeword may have the same MCS, NDI and/or RV. Similarly, hybrid automatic repeat request (HARM) feedback may also be transmitted on a per-codeword basis, as opposed to a per-layer basis.

In some cases, wireless communications system 100 may utilize one or more enhanced component carriers (eCCs). An eCC may be characterized by one or more features including: flexible bandwidth, different transmission time intervals (TTIs), and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum).

An eCC characterized by flexible bandwidth may include one or more segments that may be utilized by UEs 115 that are not capable of monitoring the whole bandwidth or prefer to use a limited bandwidth (e.g., to conserve power). In some cases, an eCC may utilize a different TTI length than other component carriers (CCs), which may include use of a reduced or variable symbol duration as compared with TTIs of the other CCs. The symbol duration may remain the same, in some cases, but each symbol may represent a distinct TTI. In some examples, an eCC may support transmissions using different TTI lengths. For example, some CCs may use uniform 1 millisecond (ms) TTIs, whereas an eCC may use a TTI length of a single symbol, a pair of symbols, or a slot. In some cases, a shorter symbol duration may also be associated with increased subcarrier spacing. In conjunction with the reduced TTI length, an eCC may utilize dynamic time division duplex (TDD) operation (i.e., it may switch from DL to UL operation for short bursts according to dynamic conditions.)

Flexible bandwidth and variable TTIs may be associated with a modified control channel configuration (e.g., an eCC may utilize an ePDCCH for DL control information). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional hybrid automatic repeat request (HARD) related control information.

In some cases, base station antennas may be located within one or more antenna arrays. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

As described herein, a UE 115 may use MIMO layer specific and codeword specific communication configurations to communicate with at least one base station 105. For example, multiple base stations 105 may be configured to provide CoMP transmissions to a UE 115. The base stations 105 may transmit a set of communications configurations to the UE 115 that include at least one MIMO layer specific or codeword specific configuration. The UE 115 may also receive an indication of at least one communication configuration that may be used to perform MIMO layer specific or codeword specific channel operations. The UE 115 may then communicate with the base stations 105 using the communications configurations.

Figure 2:
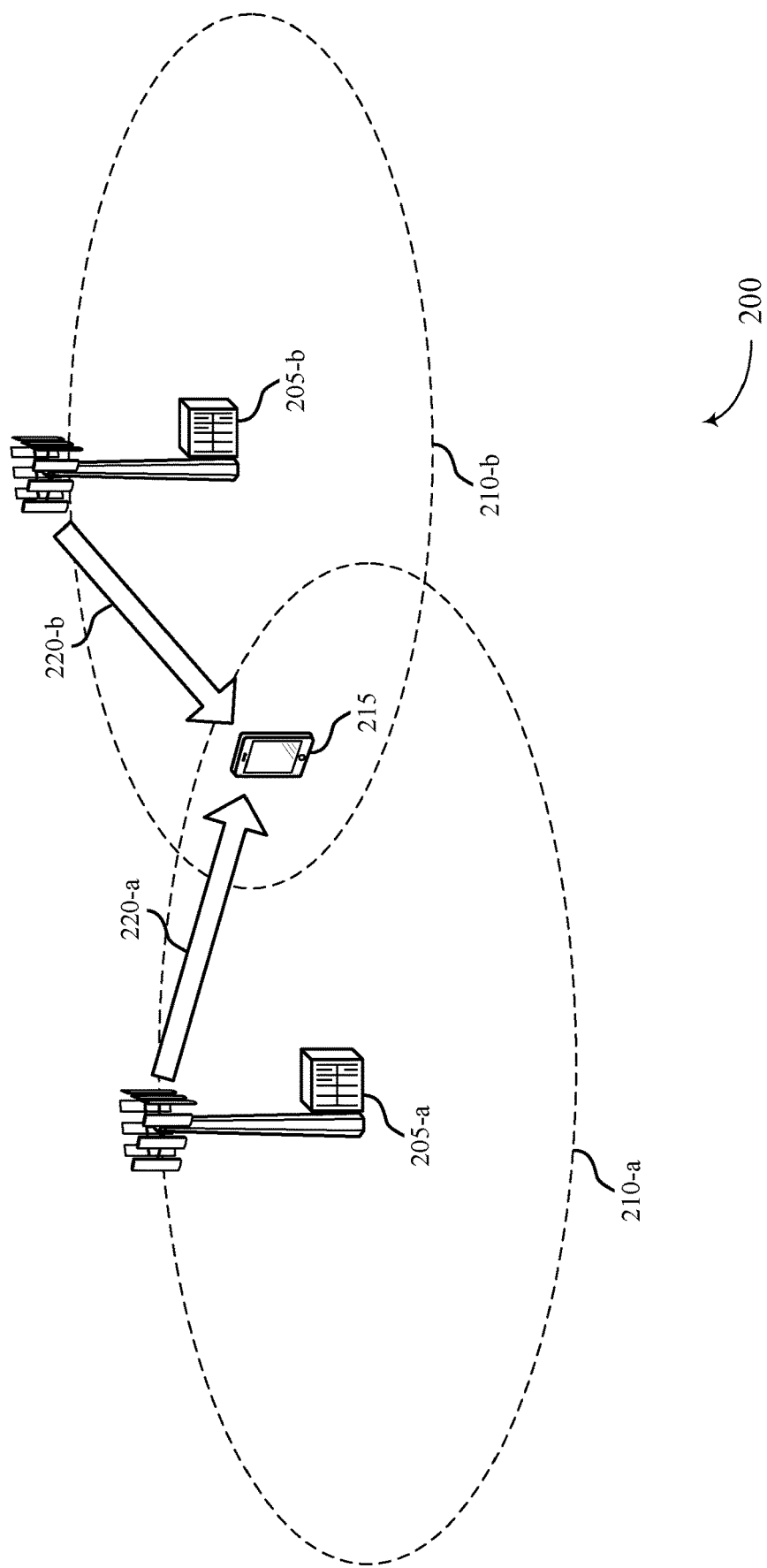
FIGS. 2 and 3 illustrate examples of wireless communications systems that support enhanced CoMP operation in accordance with aspects of the present disclosure.

FIG. 2 illustrates an example of a wireless communications system 200 for enhanced CoMP operation. Wireless communications system 200 may include one or more base stations 205 (e.g., base station 205-a and base station 205-b) and UE 215, which may be examples of a base station 105 and a UE 115 described with reference to FIG. 1, respectively. In some cases, base station 205-a and base station 205-b may provide communication coverage for geographic coverage areas 210-a and 210-b, respectively. As illustrated, in some cases, the geographic coverage areas 210-a and 210-b may partially overlap. Wireless communications system 200 may illustrate an example of MIMO layer specific CoMP transmissions where each base station is associated with a one or more MIMO layers.

Wireless communications system 200 may use a communications configuration that includes a MIMO layer specific configuration. That is, UE 215 may receive a set of communication configurations that include a MIMO layer specific configuration. The MIMO layer specific configuration may include transmitting different sets of layers 220 from different TPs or base stations, such as the base station 205-a and the base station 205-b. For example, base station 205-a may transmit a first set of layers 220-a to UE 215 and base station 205-b may transmit a second set of layers 220-b to UE 215. The first set of layers 220-a and second set of layers 220-b may comprise a complete transmission to UE 215 in accordance with CoMP techniques described above.

Each layer in a set of layers 220 may come from one base station 105. In some cases, the first set of layers 220-a may include up to four different layers based on a number of antennas used, where the second set of layers 220-b may similarly include up to four layers. The number of layers within the first set of layers 220-a or the second set of layers 220-b may depend on a configuration associated with the number of antennas used by base station 205-a or base station 205-b to communicate with UE 215. In some cases, the number of base stations 205 used to transmit sets of layers 220 may be based on the MIMO layer specific configuration, and may correspond to the number of layers transmitted (e.g., eight base stations 205 may transmit eight layers 220, where each base station 205 transmits one layer 220). In some examples, a layer specific MCS, NDI, RV, or HARQ feedback may be used. For example, UE 215 may provide HARQ feedback for each layer included in a set of layers 220.

UE 215 may report CSI feedback to the base station 205-a and the base station 205-b regarding the quality of the signals received based on the communications configuration. As will be discussed with reference to FIG. 3, MIMO layer specific configurations and codeword specific configurations may be used to indicate various communication configurations to UE 215 for each layer or codeword.

Figure 3:
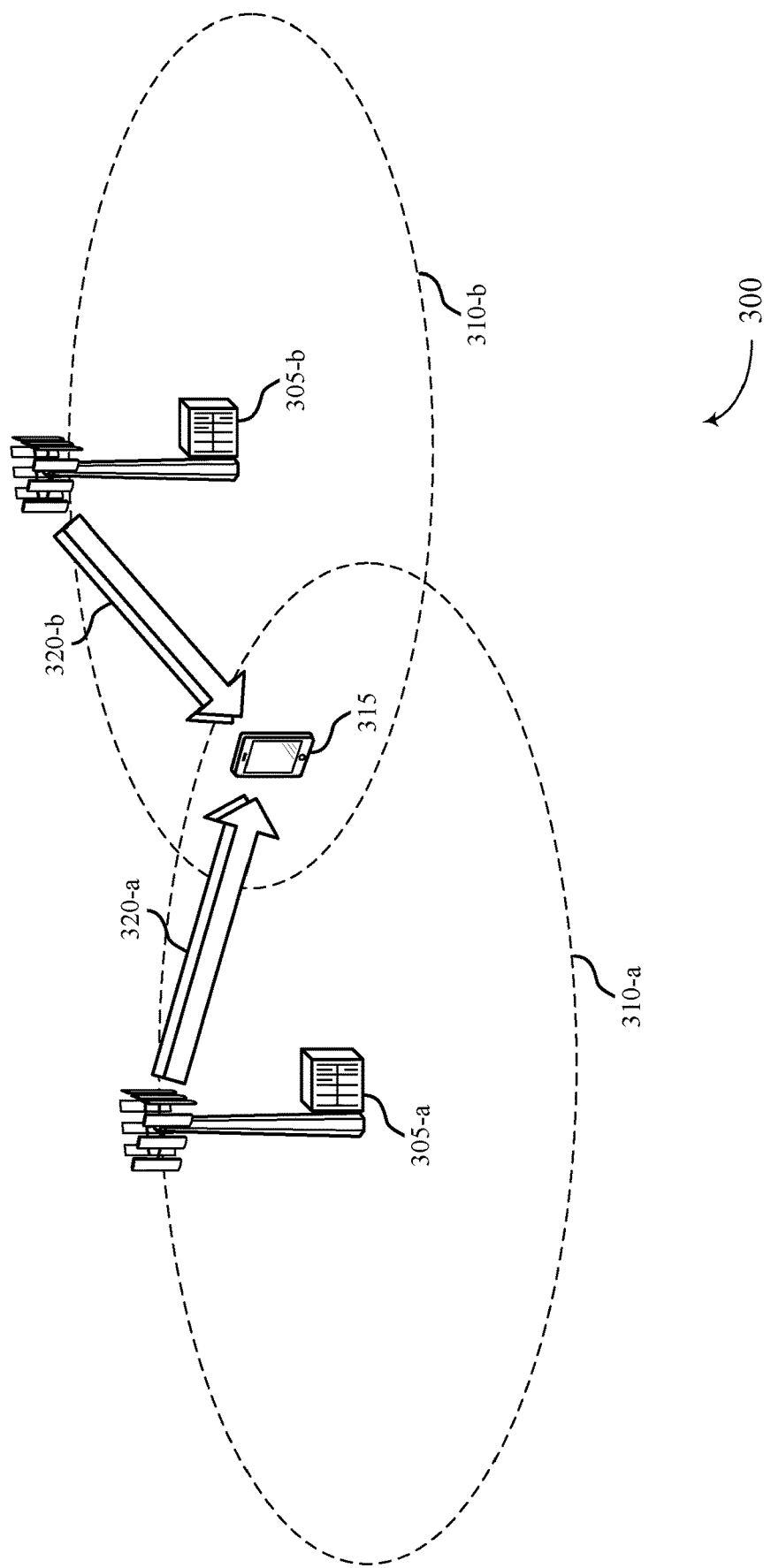

FIG. 3 illustrates an example of a wireless communications system 300 for enhanced CoMP operation. Wireless communications system 300 may include one or more base stations 305 (e.g., base station 305-a and base station 305-b) and UE 315, which may be examples of a base station 105 and a UE 115 described with reference to FIGS. 1 and 2. In some cases, base station 305-a and base station 305-b may provide communication coverage for geographic coverage areas 310-a and 310-b, respectively. As illustrated, in some cases, the geographic coverage areas 310-a and 310-b may partially overlap. Wireless communications system 300 may illustrate an example of codeword specific CoMP transmissions.

Wireless communications system 300 may use communication configurations that includes a codeword specific configuration. A codeword specific configuration may utilize a set number of codewords 315 (e.g., two codewords) for all transmission from multiple base stations 305 (e.g., base station 305-a and base station 305-b). That is, a codeword specific configuration may incorporate multiple base stations 105 in the transmission of two codewords 315. For example, base station 305-a may transmit a first codeword 320-a, and base station 305-b may transmit a second codeword 320-b. Codeword 320-a and codeword 320-b may include multiple layers of modulated symbols.

In some cases, multiple base stations 305 may appear as a single base station to UE 315. For example, a base station 305-a may transmit first codeword 320-a and another codeword 315 (not shown) may be transmitted by a combination of two base stations 305. Through the use of codeword specific methods, MCS, NDI, RV and HARQ processes may not differ from systems that do not use codeword specific configurations. In some examples, the use of a MIMO layer specific and codeword specific configurations may be combined.

In some cases, various communication configurations may be dynamically indicated on a per-layer or a per-codeword basis. These communication configurations may include one or more of a CSI power offset configuration, a CSI subframe set configuration, a codebook subset restriction, a rate matching configuration, a quasi-co-location (QCL) indication. The indication of these communication configurations may enable the UE 315 to perform operations that are also layer or codeword specific. For example, a CSI power offset parameter may provide the UE 315 with a ratio indicating the amount of power between a CSI reference signal (CSI-RS) and a physical downlink shared channel (PDSCH) that UE 315 uses to compute CSI. In some cases, when this parameter is associated with a codeword or a layer, the UE 315 may use different power offset values for different codewords or layers when the CSI is transmitted to a base station 305. Similarly, per-layer and per-codeword codebook restrictions may indicate to the UE 315 which restricted subset of ranks of a pre-coding matrix indicator that UE 315 may assume when providing CSI feedback, where the assumption may be per-layer or per-codeword instead of assuming a wide range of possible ranks and PMIs.

A CSI subframe set configuration may provide the UE 315 with two or more subframe sets, where each set may indicate a subset of subframes during which the UE 315 may perform CSI measurements and/or reporting. In some cases, when the CSI subframe set configuration is associated with MIMO layer specific or layer specific configurations, the UE 315 may use different subframe set configurations for different layers or codewords.

MIMO layer specific or codeword specific rate matching configurations may provide the UE 315 with information about the received signals from base station 305-a and base station 305-b, where the rate matching configurations may include a starting symbol for PDSCH transmissions, a multimedia broadcast multicast service (MBMS) single frequency network (MBSFN) indication, a configuration of CRS ports or CRS shifts, one or more non-zero power (NZP) CSI-RS configurations, or an ending symbol for PDSCH.

For example, a starting symbol for PDSCH may be indicated for a MIMO transmission, where a first layer may contain a first starting symbol and a second layer has a second starting symbol. Alternately, the indication may provide information that a first codeword has a starting symbol on a first layer, and a second codeword has a starting symbol on a second layer. In another example, a per-layer indication may enable different MBSFN configurations for different layers or different codewords.

In some examples, UE 315 may use one CSI process that is associated with two or more NZP CSI-RS configurations when at least one NZP CSI-RS configurations are used. Additionally, an indication of the ending symbol for PDSCH may be provided to the UE 315 on a per-layer or per codeword basis. That is, the indication may allow UE 315 to identify which symbol is the last symbol for a given transmission. In some cases, the indication of the ending PDSCH symbol may imply that the QCL indicator bit-width in downlink control information (DCI) may be increased (e.g., increase the bit-width to 3 bits). In some cases, a per-layer or per-codeword QCL configuration may be restricted to a configuration where a CRS, CSI-RS, and PDSCH demodulation reference signal (DMRS) may be assumed as quasi-co-located at least with respect to a frequency shift, a Doppler spread, a received timing, or a delay spread.

In some cases, the base stations 305-a and 305-b may have their own respective resource allocations. For example, the first base station 305-a may use a first set of resource blocks (RBs), while the second base station 305-b may use a second set of RBs, where the first set and the second set of RBs may be different (e.g., the RBs may not be equal). In some examples, base station 305-a may use a first set of RBs, whereas base station 305-b and a third base station 305 (not shown) may be combined to transmit a single codeword 315, and may both use the same set of RBs. As a result, DCI may accommodate two or more information fields associated with resource allocation, such as a per-codeword or per-layer resource allocation information field.

In some cases, multi-hypotheses CSI feedback may be supported for a CSI process (or over multiple CSI-RS processes) if two or more CSI-RS resource configurations are used for the UE 315. For example, two CSI-RS resource sets for a CSI process (e.g., CSI-RS resource set 1 and CSI-RS resource set 2) may be configured for the UE 315. The UE 115 may provide feedback based on at least resource set 1, resource set 2, and/or a combination of resource set 1 and resource set 2.

In cases where the UE 315 may be served by only one base station 305 (e.g., base station 305-a), the UE 315 may correspondingly report CSI for that base station 305-a using either resource set 1 or resource set 2. In some cases, the CSI interference measurement (CSI-IM) may be configured for a first base station 305 (e.g., base station 305-a) and may capture the interference introduced by a second base station 305 (e.g., base station 305-b). The CSI-IM configured for the second base station 305 may capture the interference introduced by the first base station 305, or vice-versa.

In some cases, the UE 315 may be intended to be served by both a first base station 305 (e.g., base station 305-a) and second base station 305 (e.g., base station 305-b), and may accordingly report CSI for the base stations 305 using the combination of resource set 1 and resource set 2. In this case, the UE 315 may refrain from assuming phase offsets between the two resource sets (e.g., resource set 1 and resource set 2) and a CSI-IM configuration may capture interference from other cells. In some cases, the UE 315 may be configured with up to three CSI-IM configurations for a CSI-RS process, or over multiple CSI-RS processes.

In some examples, base stations 305-a and 305-b may each have two transmit antennas. Furthermore, UE 315 may also have more than one receive antenna (e.g., four receive antennas). The UE 315 may be configured with a first CSI-RS resource set and a second CSI-RS resource set, where each set is associated with two ports. In some cases, the RI/PMI for the first and second resource sets may be based on 2×4 configurations. RI/PMI for the combination of resource sets 1 and 2 may be separately reported for the base stations 305-a and 305-b, where each may be based on a 2×4 configuration. In some cases, the RI/PMI reported for each base station 305 may account for the impact of the other base station 305.

In another example, the two base stations 305-a and 305-b may each have eight transmit antennas, and may communicate with the UE 315, which may have eight receive antennas. The UE 315 may be configured with a CSI-RS resource set 1 and CSI-RS resource set 2, each with eight ports. A RI/PMI for resource set 1 may be based on an 8×8 configuration and the RI/PMI for resource set 2 may also be based on an 8×8 configuration. The RI/PMI for the combination of both resource sets may be separately reported for each of the base stations 305-a and 305-b. Each CSI-RS resource set may be based on an 8×8 configuration, but may be limited to a rank 4 indication for each base station 305. For example, the RI may indicate up to rank 4 for the first base station 305-a and up to rank 2 for the second base station 305-b. In this example, a total of six layers may be used, where a first codeword is mapped to four layers and a second codeword is mapped to two layers. In some cases, this mapping configuration may not be supported when both codewords are transmitted from the same base station 305 (e.g., base station 305-a or base station 305-b). In another example, the RI may indicate up to rank 4 for a first base station 305 (e.g., base station 305-a) and up to rank 3 for a second base station 305 (e.g., base station 305-b). As mentioned above, the RI/PMI reported for each base station 305 may account for the impact of the other base station 105.

In some cases, a base station 305 may indicate a restricted RI for each base station 305 from a set of multiple base stations 305, when the set of multiple base stations 305 are communicating as long as the total number of layers does not exceed the layers available according to an antenna configuration. In some cases, the restriction may enable the number of layers for each codeword to match the layers in a system that does not use MIMO layer specific or codeword specific configurations (e.g., layers 1, 2, 3, and 4).

In some cases, combinations of MIMO layers across multiple codewords transmitted from one or more base stations 305 may match the allowed combinations transmitted by a single base station 305. That is, a set of combinations of MIMO layers across two codewords transmitted from different base stations 305 may be aligned with a set of allowed combinations for the two codewords when both codewords are transmitted from the same base station 305. For example, if a combination of four layers for a first codeword and two layers for a second codeword may not be allowed when transmitted by a single base station 305, then the same combination may not be allowed if two codewords are transmitted from different base stations 305.

Different cells may use different special subframe configurations, where a DMRS pattern may be a function of a special subframe configuration. For example, a special subframe configuration of six downlink pilot time slot (DwPTS) symbols to six guard period (GP) symbols to two uplink pilot time slot (UpPTS) symbols (6:6:2), only DMRS symbols corresponding to symbols 2 and 3 are present (e.g., one strip DMRS pattern). In some cases the same DMRS pattern may be used across cells that communicate using CoMP. As a result, only special subframes of compatible DMRS patterns may be used in, for layer specific and codeword specific configurations. For example, a DwPTS pattern with 11 and 12 symbols may be used in a codeword or layer specific configuration, but not a DwPTS pattern with 12 and 10 symbols.

In some cases, there may be different DL/UL subframe configurations for MIMO layer specific configurations, and the set of cells involved in the MIMO layer specific configurations may be subframe dependent. For example, in a first subframe, a first cell may be a DL cell, while a second cell may be used for UL transmission. Additionally, in a second subframe, both cells may be used for DL transmissions for MIMO layer specific configurations.

In some cases, an enhanced physical downlink control channel (ePDCCH) may be configured with up to two resource sets. Each ePDCCH resource set may be linked with one of four PDSCH resource element (RE) mapping and quasi-co-location indicator (PQI) resource set configurations. If PQI configurations are layer or codeword specific, the ePDCCH resource set may be linked with one of the four PCI configurations of a particular layer or codeword. For example, the first layer or codeword of an associated PQI resource configuration may be used. In some cases, the link to ePDCCH resources may depend on how the PQI resource sets are configured. For example, up to eight PQI resource sets may be configured, where each set includes a pair of PQI configurations (e.g., set 1: {PQI configuration 1.1, PQI configuration 1.2} and set 2 {PQI configuration 2.1, PQI configuration 2.2}, . . . , set 8 {PQI configuration 8.1, PQI configuration 8.2}). In some cases, ePDCCH may, for example, be linked with the first configuration of set 1 and set 5.

Figure 4:
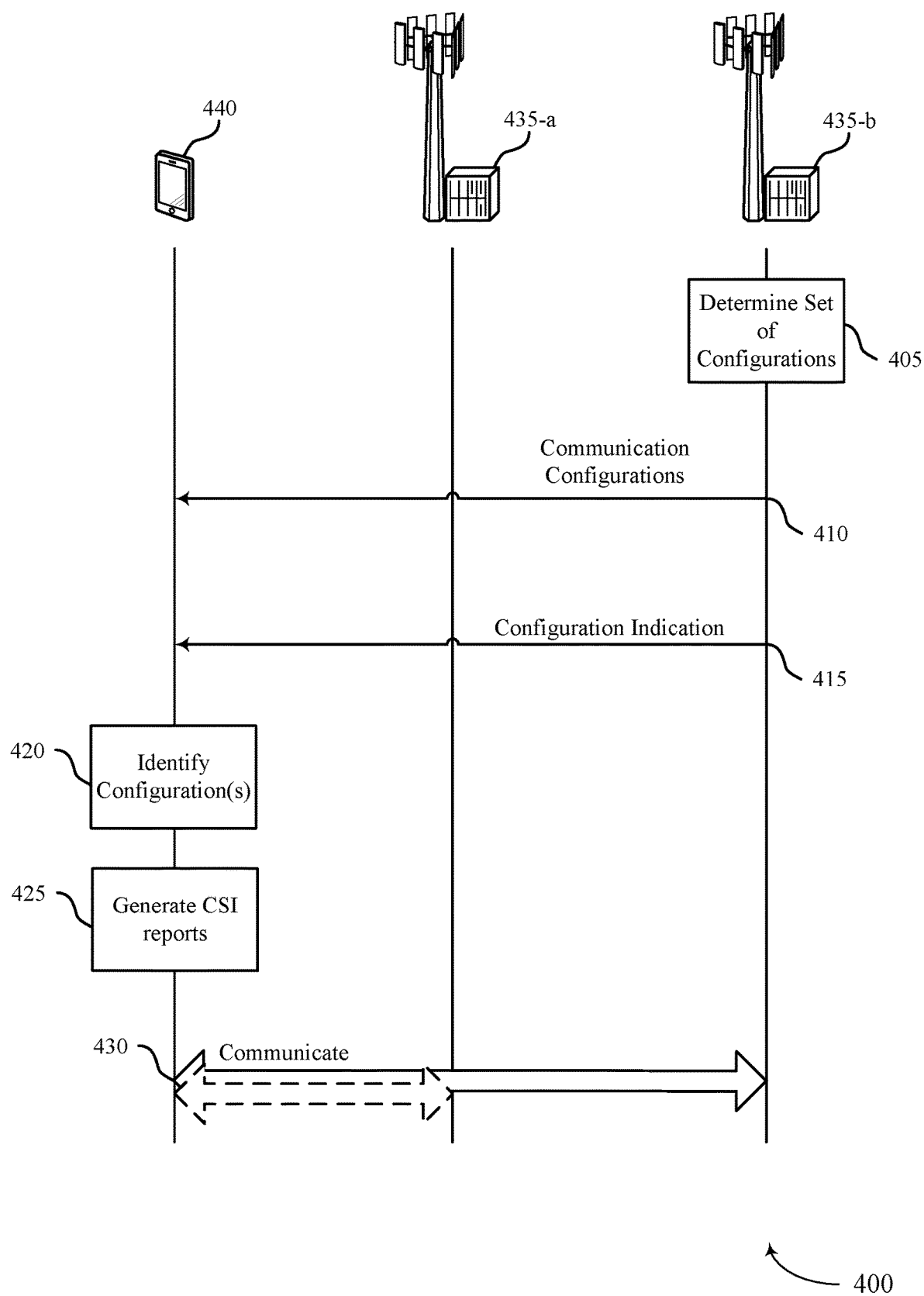
FIG. 4 illustrates an example of a process flow in a system that supports enhanced CoMP operation in accordance with aspects of the present disclosure.

FIG. 4 illustrates an example of a process flow 400 for enhanced CoMP operation in accordance with various aspects of the present disclosure. Process flow 400 may include base stations 435-a and 435-b, and UE 440, which may be examples of the corresponding devices described with reference to FIG. 1-2.

At step 405, a base station 435 may determine a set of communication configurations associated with base stations 435 (e.g., base station 435-a and base station 435-b), where at least one of the set of communication configurations is based on a MIMO layer specific communication or a codeword specific communication. The determination of the set of configurations may be completed by base station 435-a, or base station 435-b, or both. Additionally, the base stations 435 may be coordinated according to a CoMP configuration that includes a CBF mode, a DPS mode, or a JT mode.

At step 410, UE 440 may receive a set of communication configurations associated with the base stations 435 (e.g., base station 435-a and base station 435-b) where at least one of the set of communication configurations includes a MIMO layer specific configuration or a codeword specific configuration.

At step 415, UE 440 may receive an indication of a communication configuration from the set of communication configurations received at step 410. In some examples, the set of communication configurations and the indication may be transmitted by base station 435-a, or base station 435-b, or both. The communication configuration may include a CSI power offset configuration, a CSI subframe set configuration, a codebook restriction, a rate matching configuration, a QCL indication, or any combination thereof. In some cases, the rate matching configuration may include a starting symbol for PDSCH transmissions, a MBSFN indication, a CRS configuration, one or more NZP CSI-RS configurations, or any combination thereof.

At step 420, UE 440 may identify a resource allocation for each of the plurality of base stations based on the communication configuration. In some cases, UE 440 may also identify a CSI-RS port configuration for one or more of the base stations 435 (e.g., base station 435-a and base station 435-b) based on the communication configuration.

At step 425, the UE 440 may generate a CSI report for base station 435-a and/or base station 435-b, where the CSI report is based on the one or more base stations 435. In some examples, the CSI-RS port configuration may be based on a number of receive ports for UE 440 and a number of transmit ports for the one or more base stations 435. In some other cases, the UE 440 may generate an individual CSI report for the one or more TPs based on the communication configuration, where the communication configuration is based on communication with a single base station 435, such as base station 435-a. UE 440 may then transmit the individual CSI report to base station 435-a. Additionally or alternatively, UE 440 may generate a combined CSI report for each of the base stations 435 (e.g., base station 435-a and base station 435-b) based on the communication configuration, where the communication configuration is based on communication with both base stations 435. The UE 440 may then transmit the combined CSI report for each of the base stations 435, as further described with reference to step 425.

At step 430, the UE 440 may communicate with one or more base stations 435 (e.g., either base station 435-a or base station 435-b, or both) using the communication configuration. In some cases, communicating with the one or more base stations 435 may comprise transmitting to the one or more base stations 435, an individual CSI report, a combined CSI report, or both, which may be previously generated, for example, at step 425. In some cases, communicating with the one or more base stations 435 is based on the resource allocation. In some other cases, communicating is based on the ePDCCH configuration. Additionally or alternatively, communicating may be based on the CoMP configuration.

Figure 5:
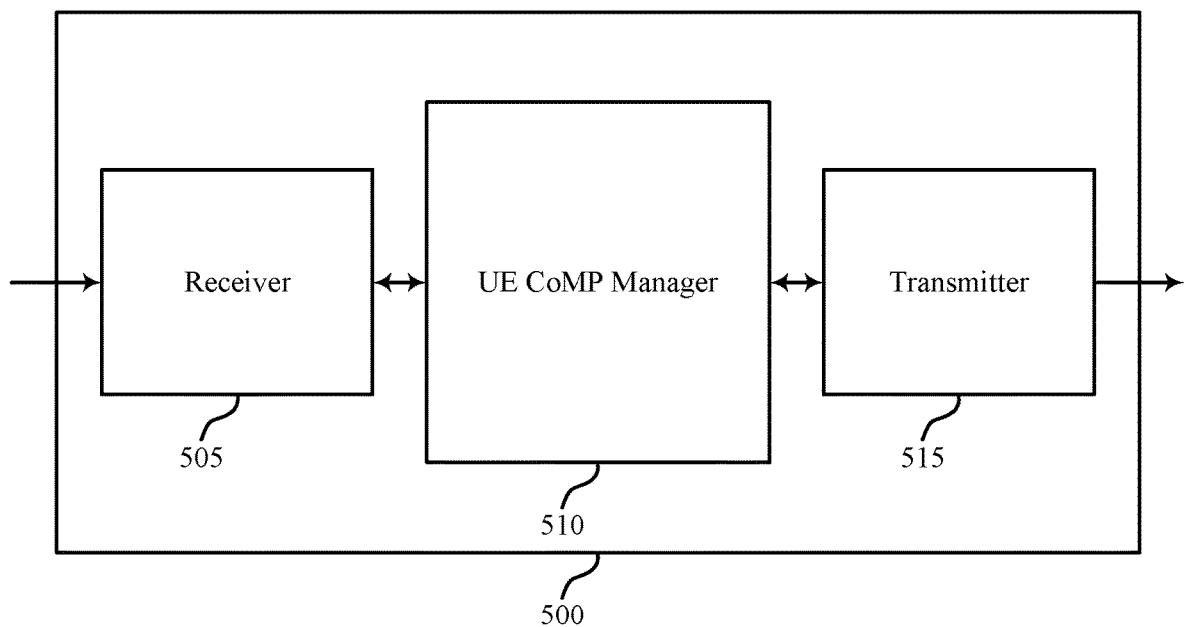
FIGS. 5 through 7 show block diagrams of a wireless device that supports enhanced CoMP operation in accordance with aspects of the present disclosure.

FIG. 5 shows a block diagram of a wireless device 500 that supports enhanced CoMP operation in accordance with various aspects of the present disclosure. Wireless device 500 may be an example of aspects of a UE 115 and UE 215 described with reference to FIGS. 1 and 2. Wireless device 500 may include receiver 505, UE CoMP manager 510 and transmitter 515. Wireless device 500 may also include a processor. Each of these components may be in communication with each other.

The receiver 505 may receive information such as packets, user data, or control information associated with various information channels (e.g., control channels, data channels, and information related to enhanced CoMP operation, etc.). Information may be passed on to other components of the device. The receiver 505 may be an example of aspects of the transceiver 825 described with reference to FIG. 8.

The UE CoMP manager 510 may receive a set of communication configurations associated with a set of base stations 105, where at least one of the set of communication configurations includes a MIMO layer specific configuration or a codeword specific configuration, receive an indication of a communication configuration from the set of communication configurations, and communicate with at least one base station 105 of the set of base stations 105 using the communication configuration. The UE CoMP manager 510 may also be an example of aspects of the UE CoMP manager 805 described with reference to FIG. 8.

The transmitter 515 may transmit signals received from other components of wireless device 500. In some examples, the transmitter 515 may be collocated with a receiver in a transceiver module. For example, the transmitter 515 may be an example of aspects of the transceiver 825 described with reference to FIG. 8. The transmitter 515 may include a single antenna, or it may include a plurality of antennas.

Figure 6:
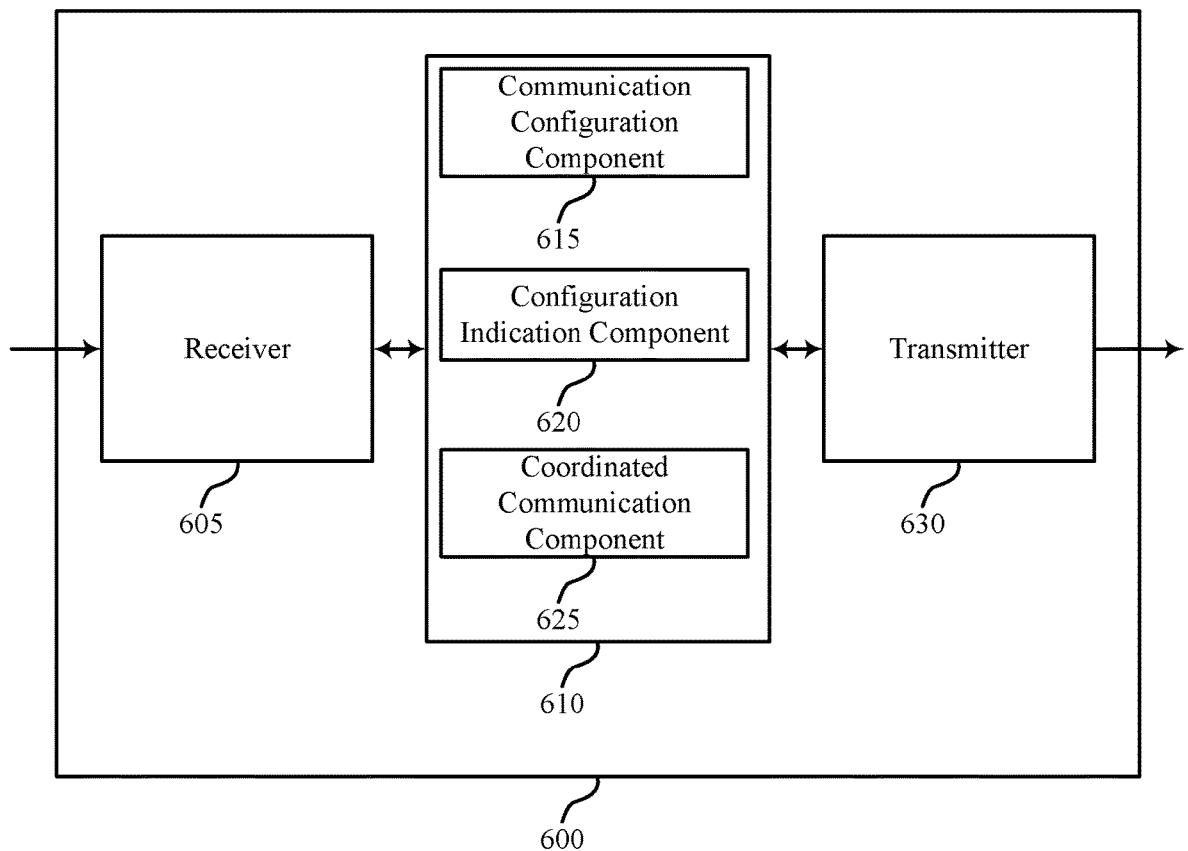

FIG. 6 shows a block diagram of a wireless device 600 that supports enhanced CoMP operation in accordance with various aspects of the present disclosure. Wireless device 600 may be an example of aspects of a wireless device 500 or a UE 115 described with reference to FIGS. 1 and 5. Wireless device 600 may include receiver 605, UE CoMP manager 610 and transmitter 630. Wireless device 600 may also include a processor. Each of these components may be in communication with each other.

The receiver 605 may receive information which may be passed on to other components of the device. The receiver 605 may also perform the functions described with reference to the receiver 505 of FIG. 5. The receiver 605 may be an example of aspects of the transceiver 825 described with reference to FIG. 8.

The UE CoMP manager 610 may be an example of aspects of UE CoMP manager 510 described with reference to FIG. 5. The UE CoMP manager 610 may include communication configuration component 615, configuration indication component 620 and coordinated communication component 625. The UE CoMP manager 610 may be an example of aspects of the UE CoMP manager 805 described with reference to FIG. 8.

The communication configuration component 615 may receive a set of communication configurations associated with a set of base stations, where at least one of the set of communication configurations includes a MIMO layer specific configuration or a codeword specific configuration. In some cases, the rate matching configuration includes a starting symbol for PDSCH transmissions, an ending symbol for PDSCH transmissions, an MBSFN indication, a CRS configuration, one or more NZP CSI-RS configurations, or any combination thereof.

In some cases, the communication configuration includes an UL configuration and a DL configuration. In some cases, the communication configuration includes an ePDCCH configuration, and where the communicating is based on the ePDCCH configuration. In some cases, the ePDCCH configuration includes one or more ePDCCH resource sets associated with the MIMO layer specific configuration or the codeword specific configuration.

In some cases, the set of base stations are coordinated according to a CoMP configuration that includes a CBF mode, a DPS mode, or a JT mode, and where communicating is based on the CoMP configuration. In some cases, the communication configuration includes a CSI power offset configuration, a CSI subframe set configuration, a codebook restriction, a rate matching configuration, a QCL indication, or any combination thereof.

The configuration indication component 620 may receive an indication of a communication configuration from the set of communication configurations. The coordinated communication component 625 may communicate with at least one base station of the set of base stations using the communication configuration.

The transmitter 630 may transmit signals received from other components of wireless device 600. In some examples, the transmitter 630 may be collocated with a receiver in a transceiver module. For example, the transmitter 630 may be an example of aspects of the transceiver 825 described with reference to FIG. 8. The transmitter 630 may utilize a single antenna, or it may utilize a plurality of antennas.

Figure 7:
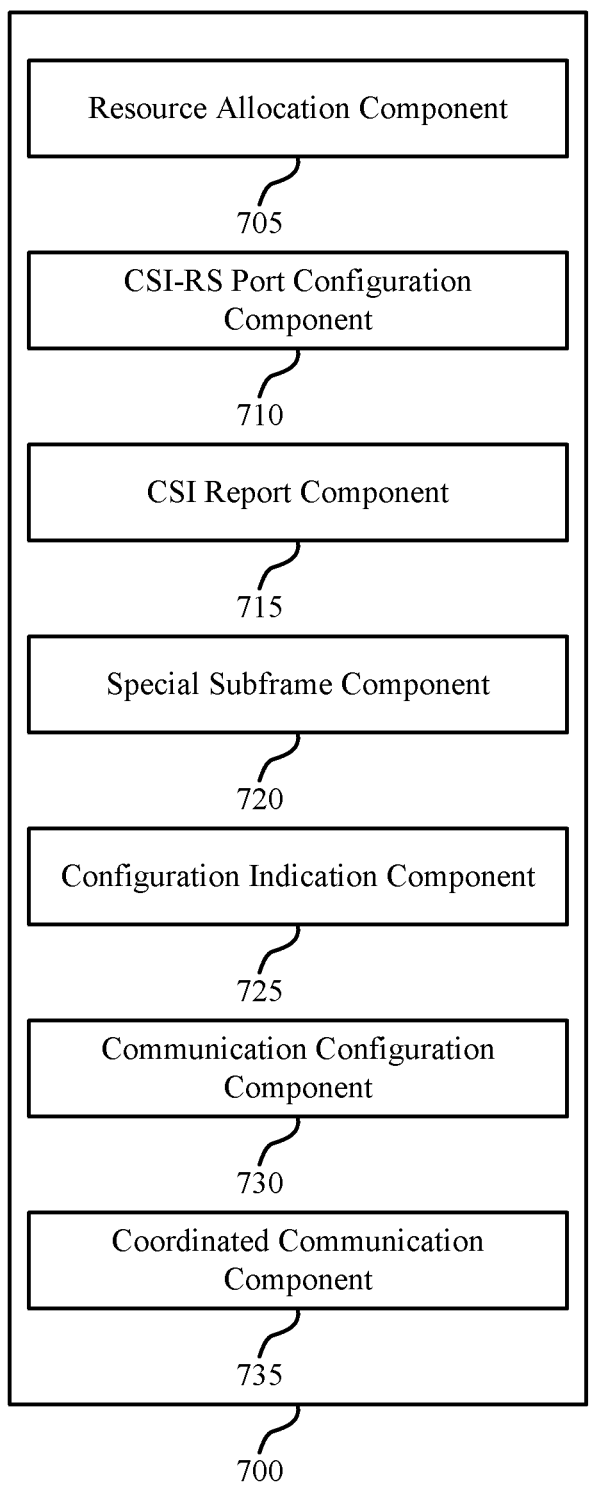

FIG. 7 shows a block diagram of a UE CoMP manager 700 which may be an example of the corresponding component of wireless device 500 or wireless device 600. That is, UE CoMP manager 700 may be an example of aspects of UE CoMP manager 510 or UE CoMP manager 610 described with reference to FIGS. 5 and 6. The UE CoMP manager 700 may also be an example of aspects of the UE CoMP manager 805 described with reference to FIG. 8.

The UE CoMP manager 700 may include resource allocation component 705, CSI-RS port configuration component 710, CSI report component 715, special subframe component 720, configuration indication component 725, communication configuration component 730 and coordinated communication component 735. Each of these modules may communicate, directly or indirectly, with one another (e.g., via one or more buses).

The resource allocation component 705 may identify a resource allocation for each of the set of base stations based on the communication configuration, where the communicating is based on the resource allocation. The CSI-RS port configuration component 710 may identify a CSI-RS port configuration for the at least one base station based on the communication configuration. In some cases, the CSI-RS port configuration is based on a number of receive ports for a UE and a number of transmit ports for the at least one base station.

The CSI report component 715 may transmit a CSI report to the at least one base station, where the CSI report is based on the CSI-RS port configuration and the set of base stations, generate an individual CSI report for the at least one base station based on the communication configuration, where the communication configuration is based on communication with a single base station, transmit the individual CSI report, generate a combined CSI report for each of the set of base stations based on the communication configuration, where the communication configuration is based on communication with the set of base stations, and transmit the combined CSI report for each of the set of base stations.

The special subframe component 720 may identify a special subframe configuration for each of the set base stations based on the communication configuration, where the communicating is based on the special subframe configuration. In some cases, the special subframe configuration includes a DMRS pattern, and where the communicating is based on the DMRS pattern. The configuration indication component 725 may receive an indication of a communication configuration from the set of communication configurations.

The communication configuration component 730 may receive a set of communication configurations associated with a set of base stations, where at least one of the set of communication configurations includes a MIMO layer specific configuration or a codeword specific configuration. The coordinated communication component 735 may communicate with at least one base station of the set of base stations using the communication configuration.

Figure 8:
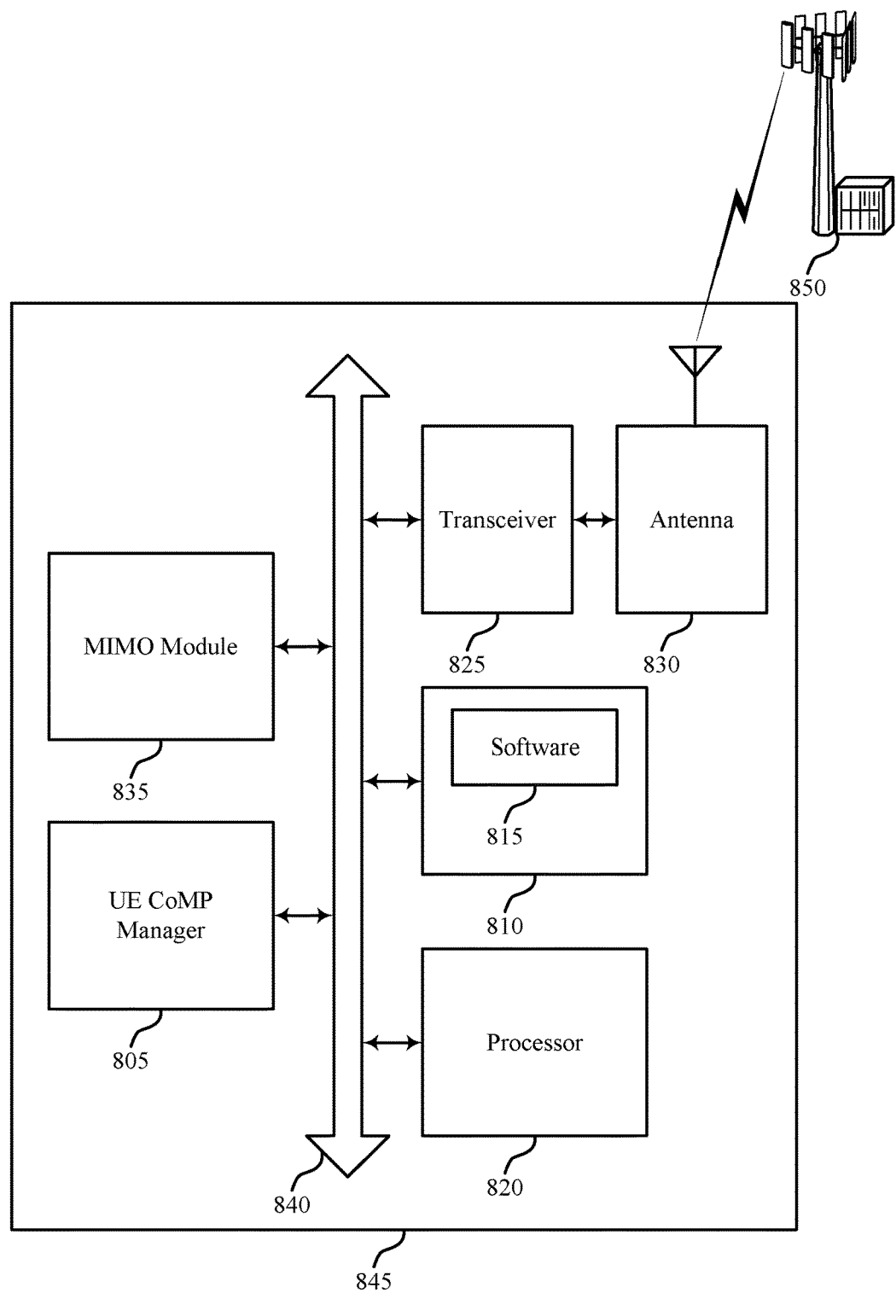
FIG. 8 illustrates a block diagram of a system including a UE that supports enhanced CoMP operation in accordance with aspects of the present disclosure.

FIG. 8 shows a diagram of a system 800 including a device that supports enhanced CoMP operation in accordance with various aspects of the present disclosure. For example, system 800 may include UE 845, which may be an example of a wireless device 500, a wireless device 600, or a UE 115 as described with reference to FIG. 1, and 5 through 7.

UE 845 may also include UE CoMP manager 805, memory 810, processor 820, transceiver 825, antenna 830 and MIMO module 835. Each of these modules may communicate, directly or indirectly, with one another (e.g., via one or more buses 840). The UE CoMP manager 805 may be an example of a UE CoMP manager as described with reference to FIGS. 5 through 7.

The memory 810 may include random access memory (RAM) and read only memory (ROM). The memory 810 may store computer-readable, computer-executable software including instructions that, when executed, cause the processor to perform various functions described herein (e.g., enhanced CoMP operation, etc.). In some cases, the software 815 may not be directly executable by the processor but may cause a computer (e.g., when compiled and executed) to perform functions described herein. The processor 820 may include an intelligent hardware device, (e.g., a central processing unit (CPU), a microcontroller, an application specific integrated circuit (ASIC), etc.)

The transceiver 825 may communicate bi-directionally, via one or more antennas, wired, or wireless links, with one or more networks, as described above. For example, the transceiver 825 may communicate bi-directionally with a base station 850 or a UE 115. The transceiver 825 may also include a modem to modulate the packets and provide the modulated packets to the antennas for transmission, and to demodulate packets received from the antennas. In some cases, the wireless device may include a single antenna 830. However, in some cases the device may have more than one antenna 830, which may be capable of concurrently transmitting or receiving multiple wireless transmissions. MIMO module 835 may enable MIMO operations such as communicating using multiple logical communications layers as described above.

Figure 9:
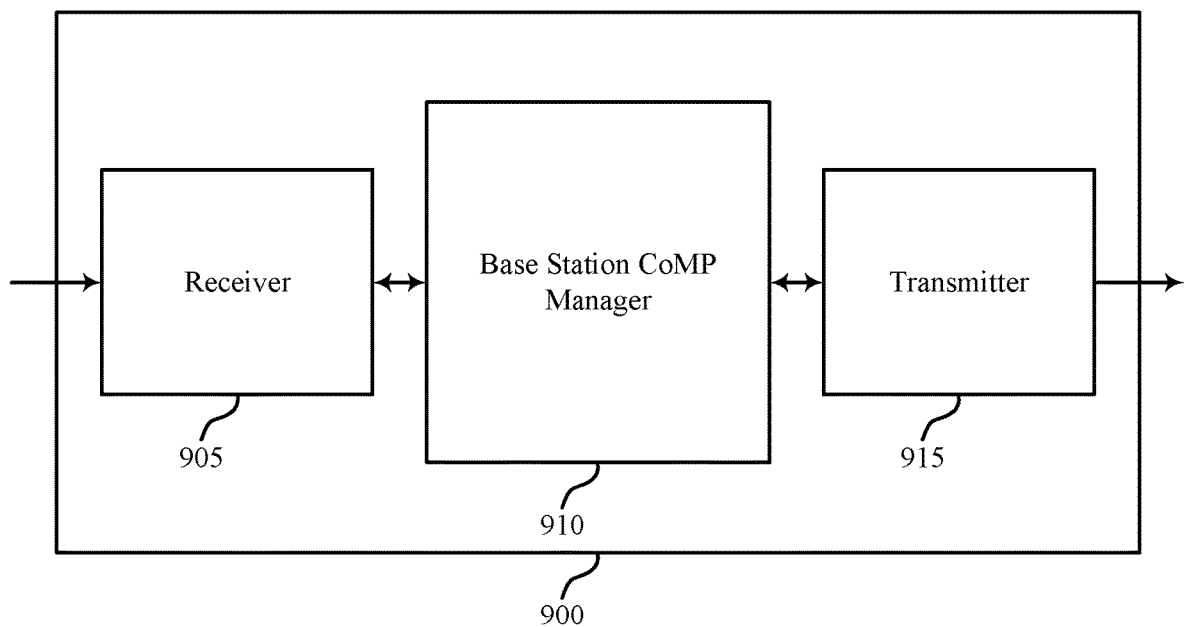
FIGS. 9 through 11 show block diagrams of a wireless device that supports enhanced CoMP operation in accordance with aspects of the present disclosure.

FIG. 9 shows a block diagram of a wireless device 900 that supports enhanced CoMP operation in accordance with various aspects of the present disclosure. Wireless device 900 may be an example of aspects of a base station 105 described with reference to FIGS. 1 and 2. Wireless device 900 may include receiver 905, base station CoMP manager 910 and transmitter 915. Wireless device 900 may also include a processor. Each of these components may be in communication with each other.

The receiver 905 may receive information such as packets, user data, or control information associated with various information channels (e.g., control channels, data channels, and information related to enhanced CoMP operation, etc.). Information may be passed on to other components of the device. The receiver 905 may be an example of aspects of the transceiver 1225 described with reference to FIG. 12.

The base station CoMP manager 910 may transmit a set of communication configurations associated with a set of base stations, where at least one of the set of communication configurations is based on a MIMO layer specific communication or a codeword specific communication, transmit an indication of a communication configuration from the set of communication configurations, and communicate with a UE using the communication configuration. The base station CoMP manager 910 may also be an example of aspects of the base station CoMP manager 1205 described with reference to FIG. 12.

The transmitter 915 may transmit signals received from other components of wireless device 900. In some examples, the transmitter 915 may be collocated with a receiver in a transceiver module. For example, the transmitter 915 may be an example of aspects of the transceiver 1225 described with reference to FIG. 12. The transmitter 915 may include a single antenna, or it may include a plurality of antennas.

Figure 10:
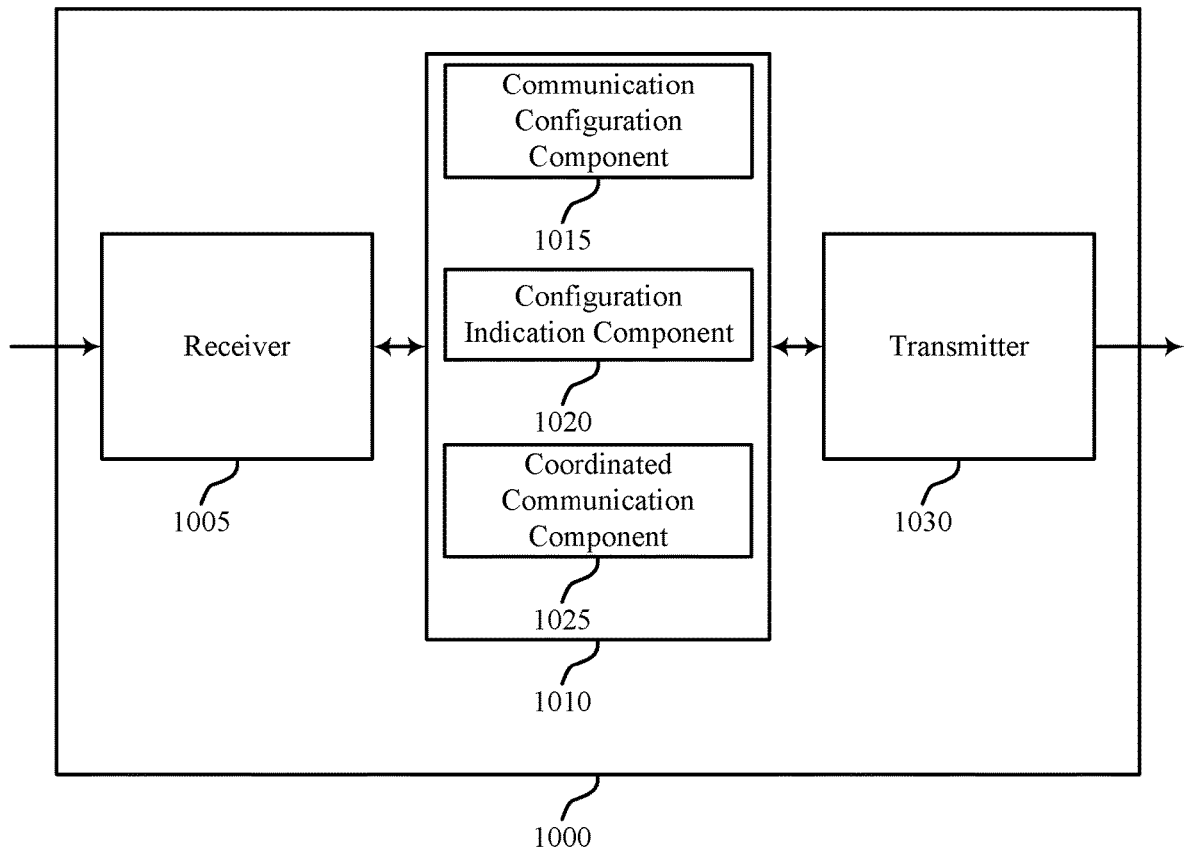

FIG. 10 shows a block diagram of a wireless device 1000 that supports enhanced CoMP operation in accordance with various aspects of the present disclosure. Wireless device 1000 may be an example of aspects of a wireless device 900 or a base station 105 described with reference to FIGS. 1, 2 and 9. Wireless device 1000 may include receiver 1005, base station CoMP manager 1010 and transmitter 1030. Wireless device 1000 may also include a processor. Each of these components may be in communication with each other.

The receiver 1005 may receive information which may be passed on to other components of the device. The receiver 1005 may also perform the functions described with reference to the receiver 905 of FIG. 9. The receiver 1005 may be an example of aspects of the transceiver 1225 described with reference to FIG. 12.

The base station CoMP manager 1010 may be an example of aspects of base station CoMP manager 910 described with reference to FIG. 9. The base station CoMP manager 1010 may include communication configuration component 1015, configuration indication component 1020 and coordinated communication component 1025. The base station CoMP manager 1010 may be an example of aspects of the base station CoMP manager 1205 described with reference to FIG. 12.

The communication configuration component 1015 may transmit a set of communication configurations associated with a set of base stations, where at least one of the set of communication configurations is based on a MIMO layer specific communication or a codeword specific communication. In some cases, the communication configuration includes a CSI power offset configuration, a CSI subframe set configuration, a codebook restriction, a rate matching configuration, a QCL indication, or any combination thereof. In some cases, the rate matching configuration includes a starting symbol for PDSCH transmissions, an ending symbol for PDSCH transmissions, an MBSFN indication, a CRS configuration, one or more NZP CSI-RS) configurations, or any combination thereof.

In some cases, the communication configuration includes a UL configuration and a DL configuration. In some cases, the communication configuration includes ePDCCH configuration, and where the communicating is based on the ePDCCH configuration. In some cases, the set of base stations are coordinated according to a CoMP configuration that includes a CBF mode, a DPS mode, or a JT mode, and where communicating is based on the CoMP configuration.

The configuration indication component 1020 may transmit an indication of a communication configuration from the set of communication configurations. The coordinated communication component 1025 may communicate with a UE using the communication configuration.

The transmitter 1030 may transmit signals received from other components of wireless device 1000. In some examples, the transmitter 1030 may be collocated with a receiver in a transceiver module. For example, the transmitter 1030 may be an example of aspects of the transceiver 1225 described with reference to FIG. 12. The transmitter 1030 may utilize a single antenna, or it may utilize a plurality of antennas.

Figure 11:
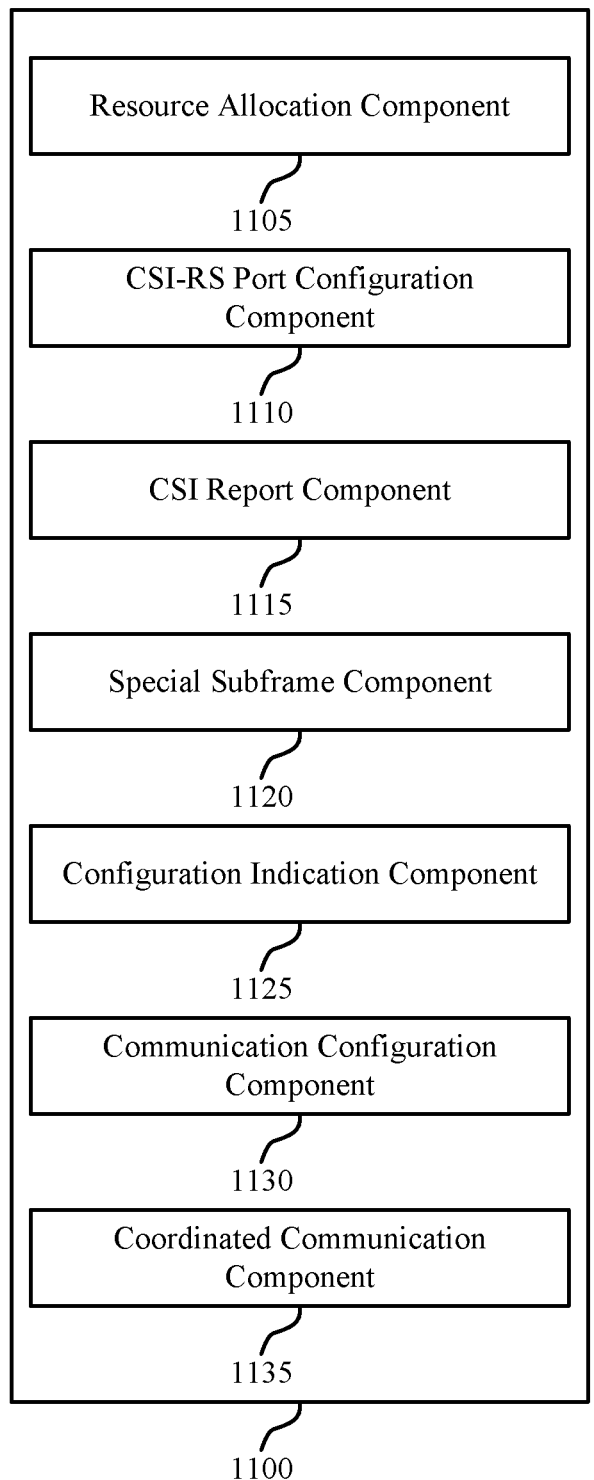

FIG. 11 shows a block diagram of a base station CoMP manager 1100 which may be an example of the corresponding component of wireless device 900 or wireless device 1000. That is, base station CoMP manager 1100 may be an example of aspects of base station CoMP manager 910 or base station CoMP manager 1010 described with reference to FIGS. 9 and 10. The base station CoMP manager 1100 may also be an example of aspects of the base station CoMP manager 1205 described with reference to FIG. 12.

The base station CoMP manager 1100 may include resource allocation component 1105, CSI-RS port configuration component 1110, CSI report component 1115, special subframe component 1120, configuration indication component 1125, communication configuration component 1130 and coordinated communication component 1135. Each of these modules may communicate, directly or indirectly, with one another (e.g., via one or more buses).

The resource allocation component 1105 may identify a resource allocation for each of the set of base stations based on the communication configuration, where the communicating is based on the resource allocation. The CSI-RS port configuration component 1110 may identify a CSI-RS port configuration based on the communication configuration. In some cases, the CSI-RS port configuration is based on a number of receive ports for a UE and a number of transmit ports.

The CSI report component 1115 may receive a CSI report based on the CSI-RS port configuration and set of base stations, receive an individual CSI report based on the communication configuration, where the communication configuration is based on communication between a UE and a single base station, and receive a combined CSI report based on the communication configuration, where the communication configuration is based on communication with the set of base stations.

The special subframe component 1120 may identify a special subframe configuration based on the communication configuration, where the communicating is based on the special subframe configuration. In some cases, the special subframe configuration includes a DMRS pattern, and where the communicating is based on the DMRS configuration. The configuration indication component 1125 may transmit an indication of a communication configuration from the set of communication configurations.

The communication configuration component 1130 may transmit a set of communication configurations associated with a set of base stations, where at least one of the set of communication configurations is based on a MIMO layer specific communication or a codeword specific communication. The coordinated communication component 1135 may communicate with a UE using the communication configuration.

Figure 12:
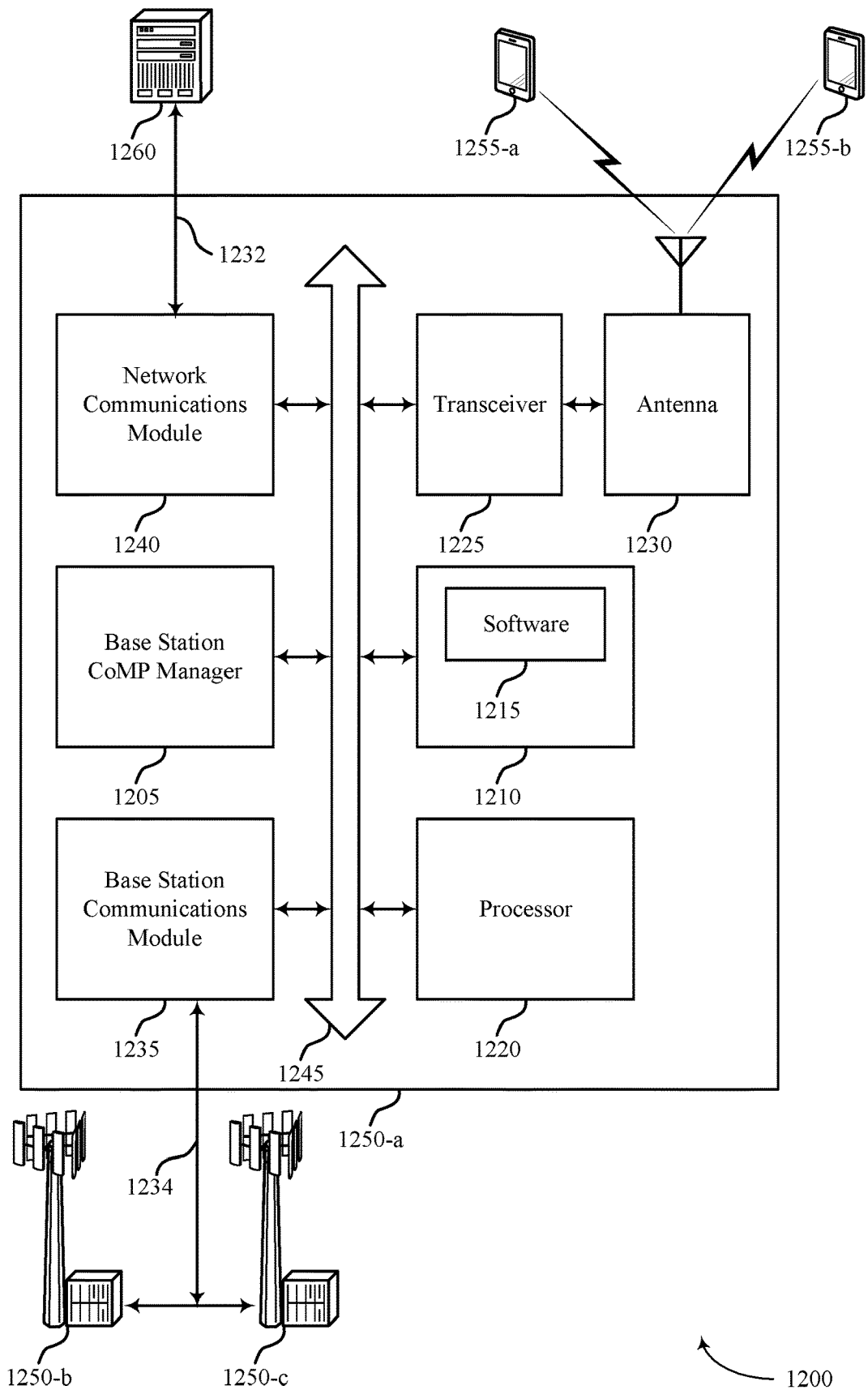
FIG. 12 illustrates a block diagram of a system including a base station that supports enhanced CoMP operation in accordance with aspects of the present disclosure.

FIG. 12 shows a diagram of a wireless system 1200 including a device that supports enhanced CoMP operation in accordance with various aspects of the present disclosure. For example, system 1200 may include base station 1250-a, which may be an example of a wireless device 900, a wireless device 1000, or a base station 105 as described with reference to FIG. 1, and 9 through 11. Base station 1250-a may also include components for bi-directional voice and data communications including components for transmitting communications and components for receiving communications. For example, base station 1250-a may communicate bi-directionally with one or more UEs 1255 (e.g., UE 1255-a and UE 1255-b).

Base station 1250-a may also include base station CoMP manager 1205, memory 1210, processor 1220, transceiver 1225, antenna 1230, base station communications module 1235 and network communications module 1240. Each of these modules may communicate, directly or indirectly, with one another (e.g., via one or more buses 1245). The base station CoMP manager 1205 may be an example of a base station CoMP manager as described with reference to FIGS. 9 through 11.

The memory 1210 may include RAM and ROM. The memory 1210 may store computer-readable, computer-executable software including instructions that, when executed, cause the processor to perform various functions described herein (e.g., enhanced CoMP operation, etc.). In some cases, the software 1215 may not be directly executable by the processor but may cause a computer (e.g., when compiled and executed) to perform functions described herein. The processor 1220 may include an intelligent hardware device, (e.g., a CPU, a microcontroller, an ASIC, etc.)

The transceiver 1225 may communicate bi-directionally, via one or more antennas, wired, or wireless links, with one or more networks, as described above. For example, the transceiver 1225 may communicate bi-directionally with a base station 1250 or a UE 1255. The transceiver 1225 may also include a modem to modulate the packets and provide the modulated packets to the antennas for transmission, and to demodulate packets received from the antennas. In some cases, the wireless device may include a single antenna 1230. However, in some cases the device may have more than one antenna 1230, which may be capable of concurrently transmitting or receiving multiple wireless transmissions.

The base station communications module 1235 may manage communications with other base stations 1250, and may include a controller or scheduler for controlling communications with UEs 1255 in cooperation with other base stations 1250. For example, the base station communications module 1235 may coordinate scheduling for transmissions to UEs 1255 for various interference mitigation techniques such as beamforming or joint transmission. In some examples, base station communications module 1235 may provide an X2 interface 1234 within an LTE/LTE-A wireless communication network technology to provide communication between one or more other base stations 1250 (e.g., base station 1250-b, base station 1250-c, or both). In some cases, X2 interface 1234 may be an example of a backhaul link 134 as described with reference to FIG. 1.

The network communications module 1240 may manage communications with the core network 1260 (e.g., via one or more wired backhaul links 1232). In some cases, the core network 1260 and the backhaul link 1232 may examples of a core network 130 and a backhaul link 132 as described with reference to FIG. 1. For example, the network communications module 1240 may manage the transfer of data communications for client devices, such as one or more UEs 1255.

Figure 13:
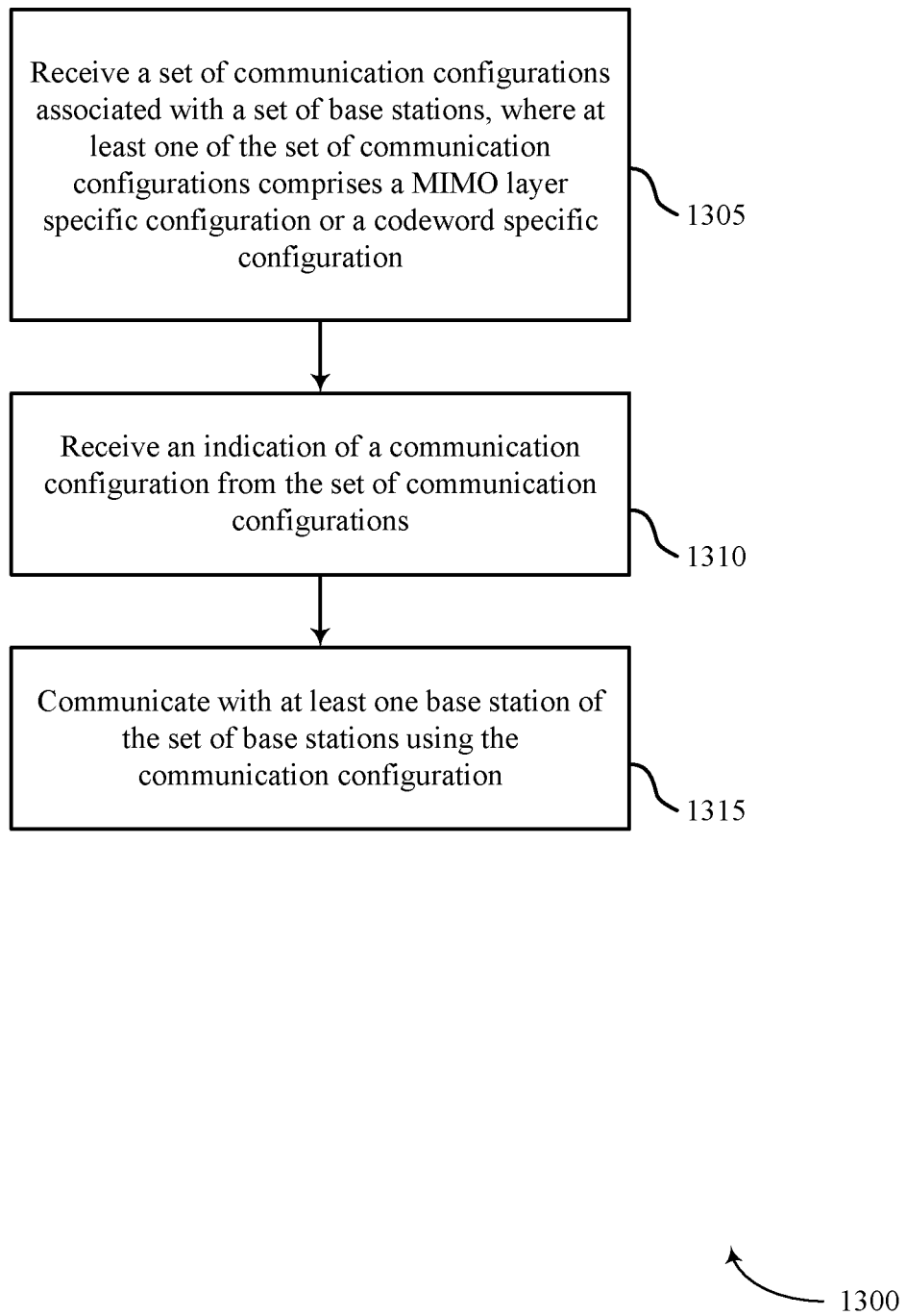
FIGS. 13 through 19 illustrate methods for enhanced CoMP operation in accordance with aspects of the present disclosure.

FIG. 13 shows a flowchart illustrating a method 1300 for enhanced CoMP operation in accordance with various aspects of the present disclosure. The operations of method 1300 may be implemented by a device such as a UE 115 or a UE 215, or their components, as described with reference to FIGS. 1 and 2. For example, the operations of method 1300 may be performed by the UE CoMP manager as described herein. In some examples, the UE 115 may execute a set of codes to control the functional elements of the device to perform the functions described below. Additionally or alternatively, the UE 115 may perform aspects of the functions described below using special-purpose hardware.

At block 1305, the UE 115 may receive a set of communication configurations associated with a set of base stations, where at least one of the set of communication configurations includes a MIMO layer specific configuration or a codeword specific configuration as described above with reference to FIGS. 2 through 4. In certain examples, the operations of block 1305 may be performed by the communication configuration component as described with reference to FIGS. 6 and 7.

At block 1310, the UE 115 may receive an indication of a communication configuration from the set of communication configurations as described above with reference to FIGS. 2 through 4. In certain examples, the operations of block 1310 may be performed by the configuration indication component as described with reference to FIGS. 6 and 7.

At block 1315, the UE 115 may communicate with at least one base station of the set of base stations using the communication configuration as described above with reference to FIGS. 2 through 4. In certain examples, the operations of block 1315 may be performed by the coordinated communication component as described with reference to FIGS. 6 and 7.

Figure 14:
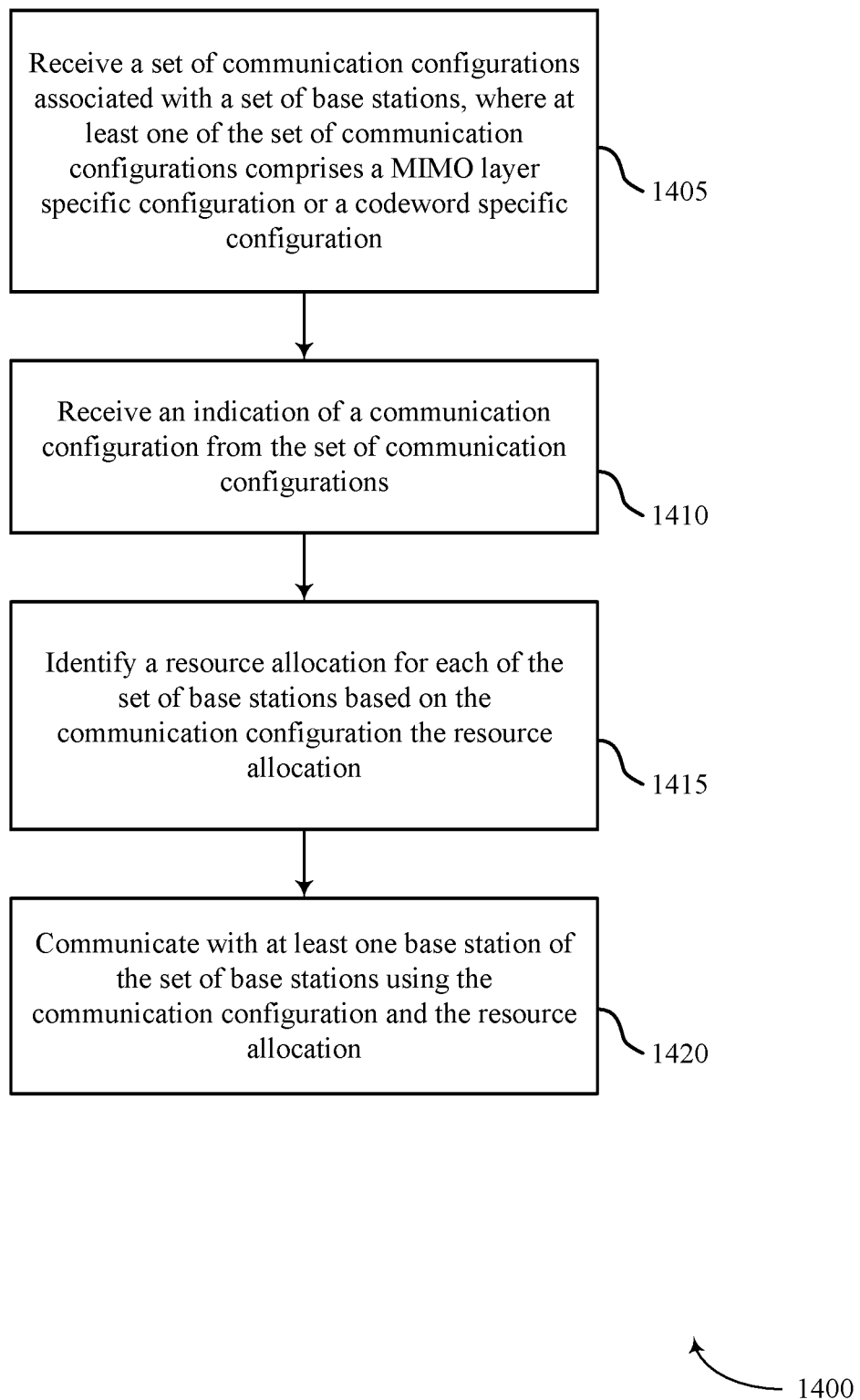

FIG. 14 shows a flowchart illustrating a method 1400 for enhanced CoMP operation in accordance with various aspects of the present disclosure. The operations of method 1400 may be implemented by a device such as a UE 115 or a UE 215, or their components, as described with reference to FIGS. 1 and 2. For example, the operations of method 1400 may be performed by the UE CoMP manager as described herein. In some examples, the UE 115 may execute a set of codes to control the functional elements of the device to perform the functions described below. Additionally or alternatively, the UE 115 may perform aspects of the functions described below using special-purpose hardware.

At block 1405, the UE 115 may receive a set of communication configurations associated with a set of base stations, where at least one of the set of communication configurations includes a MIMO layer specific configuration or a codeword specific configuration as described above with reference to FIGS. 2 through 4. In certain examples, the operations of block 1405 may be performed by the communication configuration component as described with reference to FIGS. 6 and 7.

At block 1410, the UE 115 may receive an indication of a communication configuration from the set of communication configurations as described above with reference to FIGS. 2 through 4. In certain examples, the operations of block 1410 may be performed by the configuration indication component as described with reference to FIGS. 6 and 7.

At block 1415, the UE 115 may identify a resource allocation for each of the set of base stations based on the communication configuration, where the communicating is based on the resource allocation as described above with reference to FIGS. 2 through 4. In certain examples, the operations of block 1415 may be performed by the resource allocation component as described with reference to FIGS. 6 and 7.

At block 1420, the UE 115 may communicate with at least one base station of the set of base stations using the communication configuration as described above with reference to FIGS. 2 through 4. In certain examples, the operations of block 1420 may be performed by the coordinated communication component as described with reference to FIGS. 6 and 7.

Figure 15:
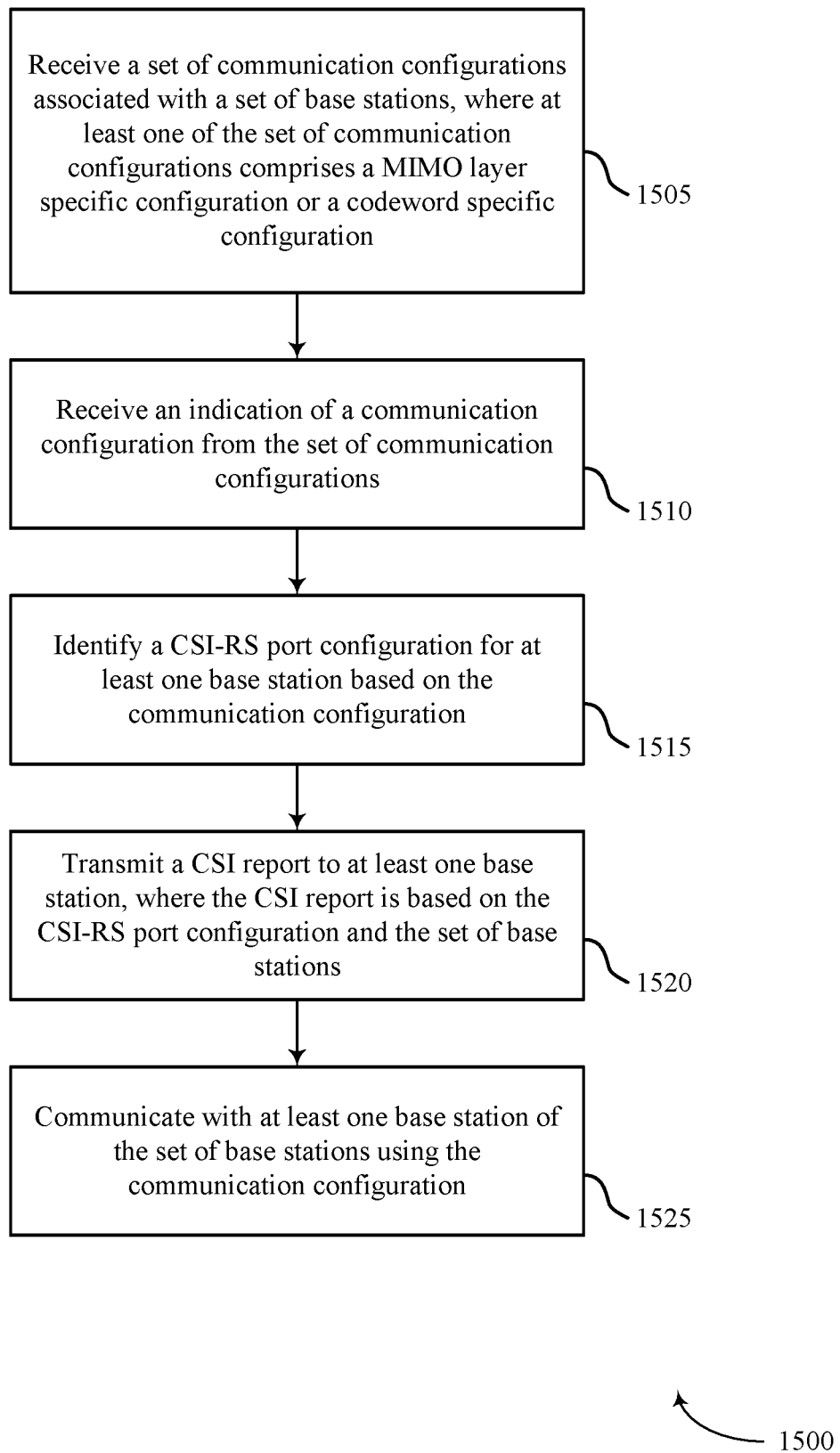

FIG. 15 shows a flowchart illustrating a method 1500 for enhanced CoMP operation in accordance with various aspects of the present disclosure. The operations of method 1500 may be implemented by a device such as a UE 115 or a UE 215, or their components, as described with reference to FIGS. 1 and 2. For example, the operations of method 1500 may be performed by the UE CoMP manager as described herein. In some examples, the UE 115 may execute a set of codes to control the functional elements of the device to perform the functions described below. Additionally or alternatively, the UE 115 may perform aspects of the functions described below using special-purpose hardware.

At block 1505, the UE 115 may receive a set of communication configurations associated with a set of base stations, where at least one of the set of communication configurations includes a MIMO layer specific configuration or a codeword specific configuration as described above with reference to FIGS. 2 through 4. In certain examples, the operations of block 1505 may be performed by the communication configuration component as described with reference to FIGS. 6 and 7.

At block 1510, the UE 115 may receive an indication of a communication configuration from the set of communication configurations as described above with reference to FIGS. 2 through 4. In certain examples, the operations of block 1510 may be performed by the configuration indication component as described with reference to FIGS. 6 and 7.

At block 1515, the UE 115 may identify a CSI-RS port configuration for at least one base station based on the communication configuration as described above with reference to FIGS. 2 through 4. In certain examples, the operations of block 1515 may be performed by the CSI-RS port configuration component as described with reference to FIGS. 6 and 7.

At block 1520, the UE 115 may transmit a CSI report to at least one base station, where the CSI report is based on the CSI-RS port configuration and the set of base stations as described above with reference to FIGS. 2 through 4. In certain examples, the operations of block 1520 may be performed by the CSI report component as described with reference to FIGS. 6 and 7.

At block 1525, the UE 115 may communicate with at least one base station of the set of base stations using the communication configuration as described above with reference to FIGS. 2 through 4. In certain examples, the operations of block 1525 may be performed by the coordinated communication component as described with reference to FIGS. 6 and 7.

Figure 16:
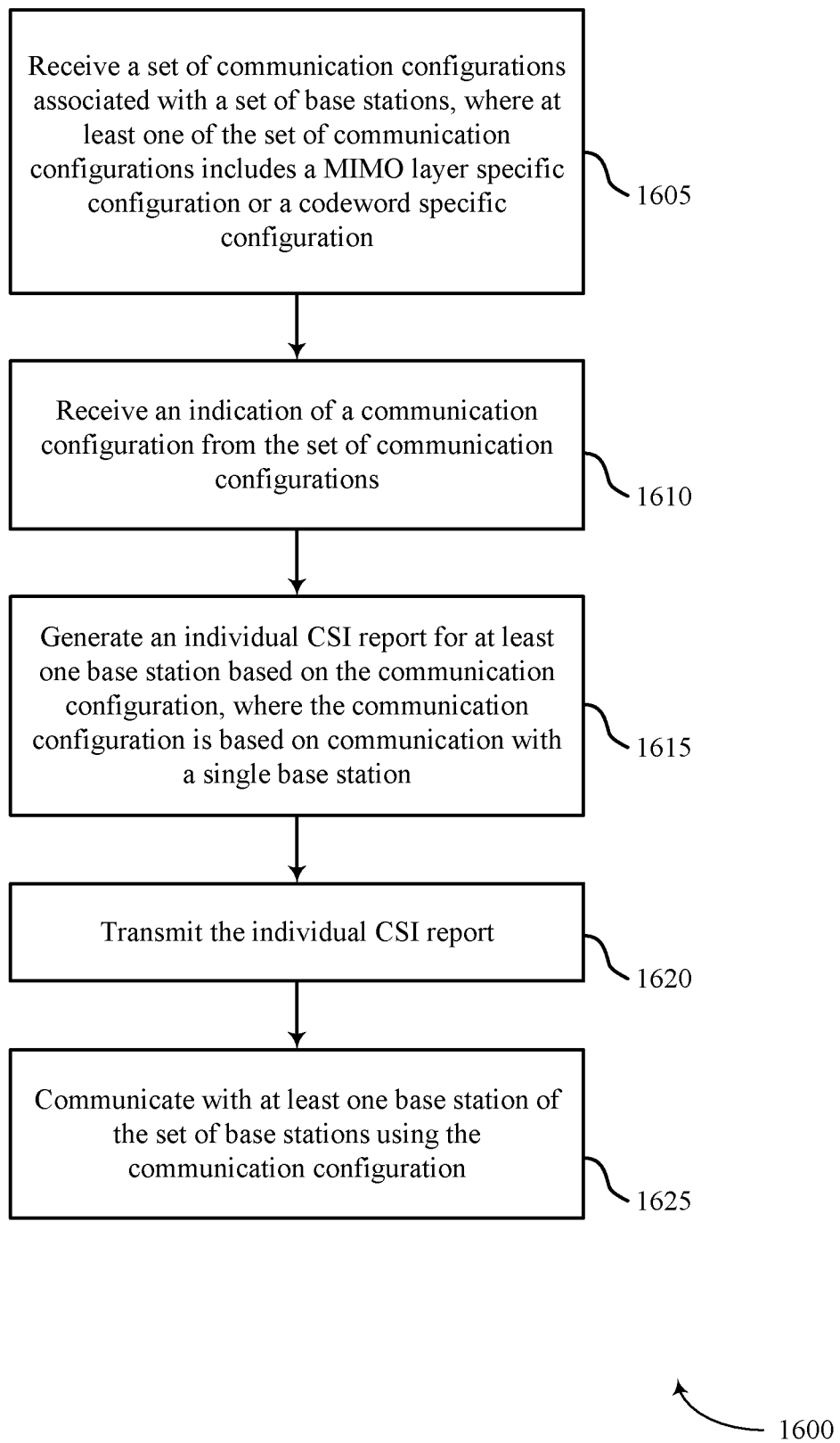

FIG. 16 shows a flowchart illustrating a method 1600 for enhanced CoMP operation in accordance with various aspects of the present disclosure. The operations of method 1600 may be implemented by a device such as a UE 115 or a UE 215, or their components, as described with reference to FIGS. 1 and 2. For example, the operations of method 1600 may be performed by the UE CoMP manager as described herein. In some examples, the UE 115 may execute a set of codes to control the functional elements of the device to perform the functions described below. Additionally or alternatively, the UE 115 may perform aspects of the functions described below using special-purpose hardware.

At block 1605, the UE 115 may receive a set of communication configurations associated with a set of base stations, where at least one of the set of communication configurations includes a MIMO layer specific configuration or a codeword specific configuration as described above with reference to FIGS. 2 through 4. In certain examples, the operations of block 1605 may be performed by the communication configuration component as described with reference to FIGS. 6 and 7.

At block 1610, the UE 115 may receive an indication of a communication configuration from the set of communication configurations as described above with reference to FIGS. 2 through 4. In certain examples, the operations of block 1610 may be performed by the configuration indication component as described with reference to FIGS. 6 and 7.

At block 1615, the UE 115 may generate an individual CSI report for at least one base station based on the communication configuration, where the communication configuration is based on communication with a single base station as described above with reference to FIGS. 2 through 4. In certain examples, the operations of block 1615 may be performed by the CSI report component as described with reference to FIGS. 6 and 7.

At block 1620, the UE 115 may transmit the individual CSI report as described above with reference to FIGS. 2 through 4. In certain examples, the operations of block 1620 may be performed by the CSI report component as described with reference to FIGS. 6 and 7.

At block 1625, the UE 115 may communicate with at least one base station of the set of base stations using the communication configuration as described above with reference to FIGS. 2 through 4. In certain examples, the operations of block 1625 may be performed by the coordinated communication component as described with reference to FIGS. 6 and 7.

Figure 17:
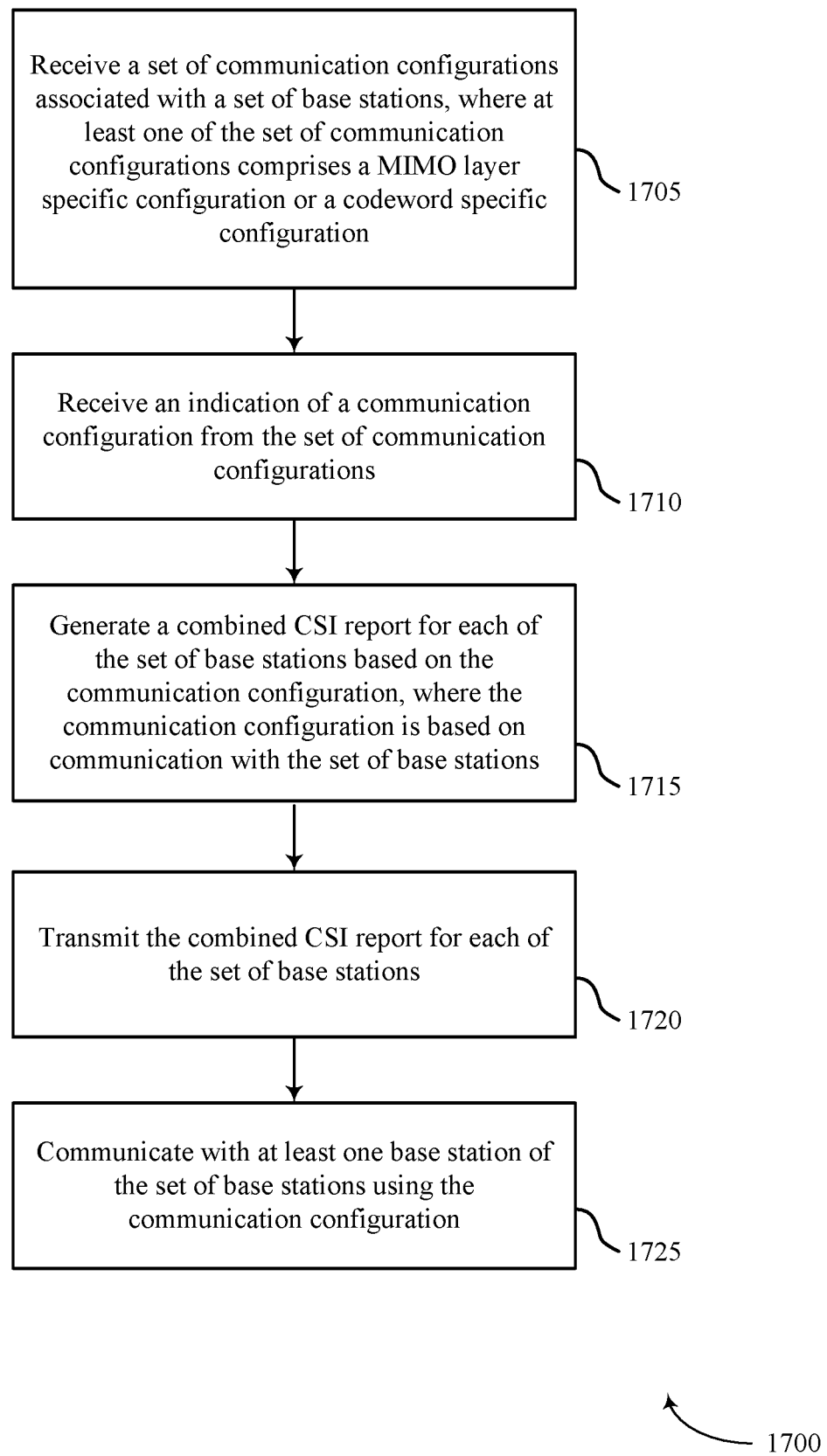

FIG. 17 shows a flowchart illustrating a method 1700 for enhanced CoMP operation in accordance with various aspects of the present disclosure. The operations of method 1700 may be implemented by a device such as a UE 115 or a UE 215, or their components, as described with reference to FIGS. 1 and 2. For example, the operations of method 1700 may be performed by the UE CoMP manager as described herein. In some examples, the UE 115 may execute a set of codes to control the functional elements of the device to perform the functions described below. Additionally or alternatively, the UE 115 may perform aspects of the functions described below using special-purpose hardware.

At block 1705, the UE 115 may receive a set of communication configurations associated with a set of base stations, where at least one of the set of communication configurations includes a MIMO layer specific configuration or a codeword specific configuration as described above with reference to FIGS. 2 through 4. In certain examples, the operations of block 1705 may be performed by the communication configuration component as described with reference to FIGS. 6 and 7.

At block 1710, the UE 115 may receive an indication of a communication configuration from the set of communication configurations as described above with reference to FIGS. 2 through 4. In certain examples, the operations of block 1710 may be performed by the configuration indication component as described with reference to FIGS. 6 and 7.

At block 1715, the UE 115 may generate a combined CSI report for each of the set of base stations based on the communication configuration, where the communication configuration is based on communication with the set of base stations as described above with reference to FIGS. 2 through 4. In certain examples, the operations of block 1715 may be performed by the CSI report component as described with reference to FIGS. 6 and 7.

At block 1720, the UE 115 may transmit the combined CSI report for each of the set of base stations as described above with reference to FIGS. 2 through 4. In certain examples, the operations of block 1720 may be performed by the CSI report component as described with reference to FIGS. 6 and 7.

At block 1725, the UE 115 may communicate with at least one base station of the set of base stations using the communication configuration as described above with reference to FIGS. 2 through 4. In certain examples, the operations of block 1725 may be performed by the coordinated communication component as described with reference to FIGS. 6 and 7.

Figure 18:
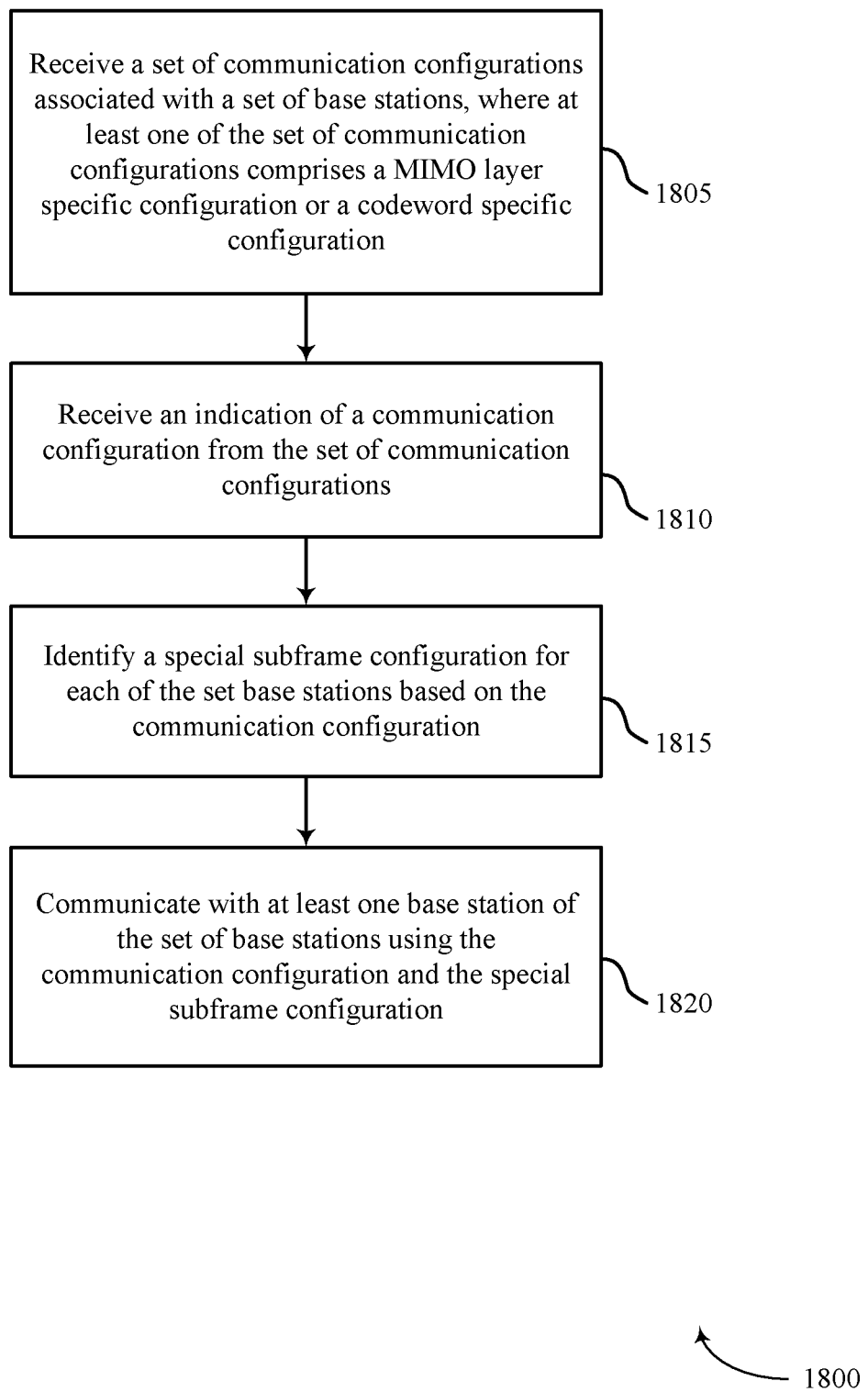

FIG. 18 shows a flowchart illustrating a method 1800 for enhanced CoMP operation in accordance with various aspects of the present disclosure. The operations of method 1800 may be implemented by a device such as a UE 115 or a UE 215, or their components, as described with reference to FIGS. 1 and 2. For example, the operations of method 1800 may be performed by the UE CoMP manager as described herein. In some examples, the UE 115 may execute a set of codes to control the functional elements of the device to perform the functions described below. Additionally or alternatively, the UE 115 may perform aspects of the functions described below using special-purpose hardware.

At block 1805, the UE 115 may receive a set of communication configurations associated with a set of base stations, where at least one of the set of communication configurations includes a MIMO layer specific configuration or a codeword specific configuration as described above with reference to FIGS. 2 through 4. In certain examples, the operations of block 1805 may be performed by the communication configuration component as described with reference to FIGS. 6 and 7.

At block 1810, the UE 115 may receive an indication of a communication configuration from the set of communication configurations as described above with reference to FIGS. 2 through 4. In certain examples, the operations of block 1810 may be performed by the configuration indication component as described with reference to FIGS. 6 and 7.

At block 1815, the UE 115 may identify a special subframe configuration for each of the set base stations based on the communication configuration, where the communicating is based on the special subframe configuration as described above with reference to FIGS. 2 through 4. In certain examples, the operations of block 1815 may be performed by the special subframe component as described with reference to FIGS. 6 and 7.

At block 1820, the UE 115 may communicate with at least one base station of the set of base stations using the communication configuration and the special subframe configuration as described above with reference to FIGS. 2 through 4. In certain examples, the operations of block 1820 may be performed by the coordinated communication component as described with reference to FIGS. 6 and 7.

Figure 19:
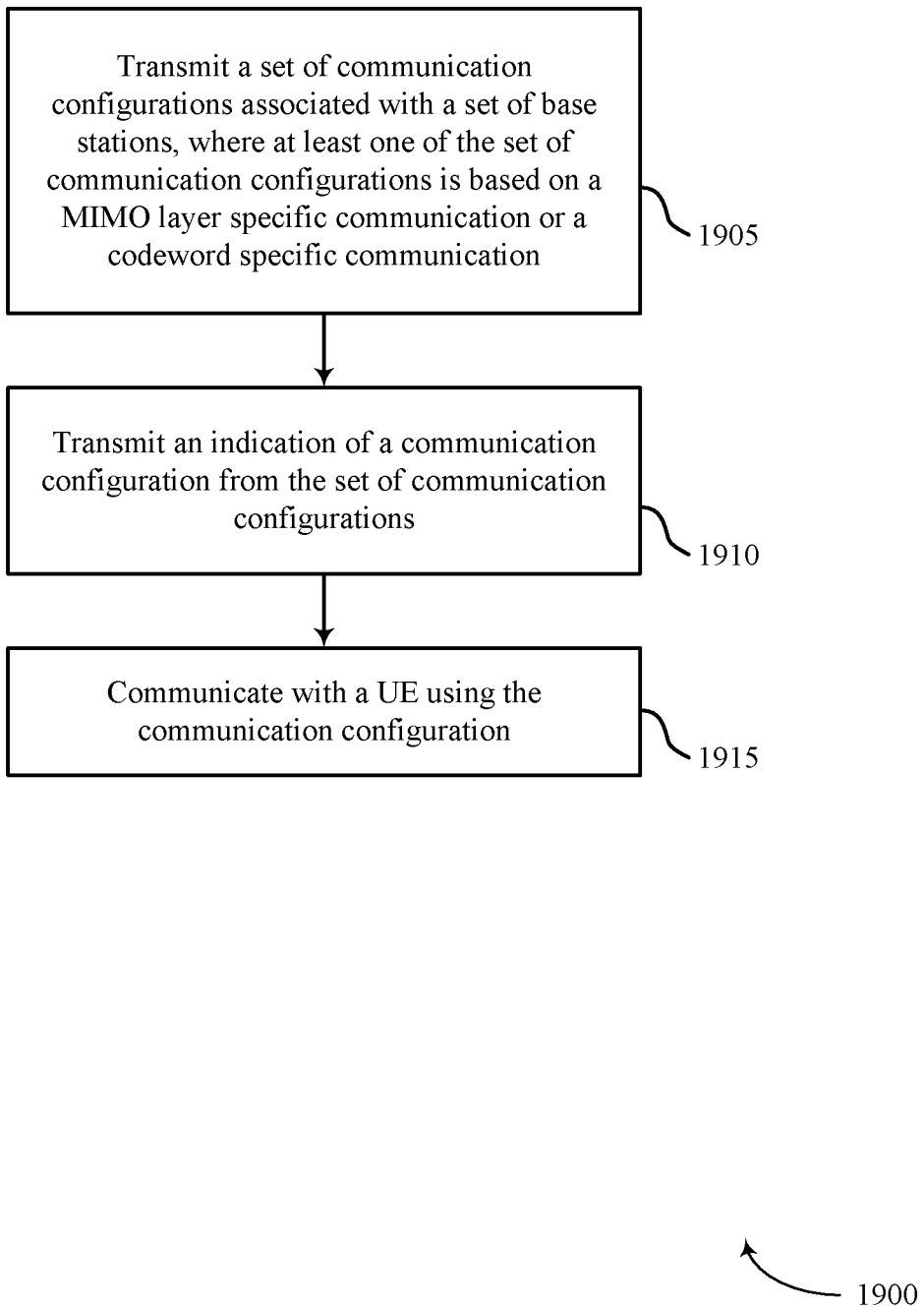

FIG. 19 shows a flowchart illustrating a method 1900 for enhanced CoMP operation in accordance with various aspects of the present disclosure. The operations of method 1900 may be implemented by a device such as a base station 105 or its components as described with reference to FIG. 1. For example, the operations of method 1900 may be performed by the base station CoMP manager as described herein. In some examples, the base station 105 may execute a set of codes to control the functional elements of the device to perform the functions described below. Additionally or alternatively, the base station 105 may perform aspects of the functions described below using special-purpose hardware.

At block 1905, the base station 105 may transmit a set of communication configurations associated with a set of base stations, where at least one of the set of communication configurations is based on a MIMO layer specific communication or a codeword specific communication as described above with reference to FIGS. 2 through 4. In certain examples, the operations of block 1905 may be performed by the communication configuration component as described with reference to FIGS. 10 and 11.

At block 1910, the base station 105 may transmit an indication of a communication configuration from the set of communication configurations as described above with reference to FIGS. 2 through 4. In certain examples, the operations of block 1910 may be performed by the configuration indication component as described with reference to FIGS. 10 and 11.

At block 1915, the base station 105 may communicate with a UE using the communication configuration as described above with reference to FIGS. 2 through 4. In certain examples, the operations of block 1915 may be performed by the coordinated communication component as described with reference to FIGS. 10 and 11.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for enhanced CoMP operation.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical (physical) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)).

An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell.

The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for enhanced CoMP operation. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
receiving a set of communication configurations associated with a plurality of base stations, wherein a communication configuration of the set of communication configurations comprises a codeword specific configuration comprising a quasicolocation (QCL) indication and a rate matching configuration, and wherein the QCL indication indicates that a first set of demodulation reference signal (DMRS) antenna ports associated with a first codeword are quasi-co-located and that the first set of DMRS antenna ports are not quasi-co-located with a second set of DMRS antenna ports associated with a second codeword;
receiving an indication of the communication configuration from the set of communication configurations; and
communicating with at least one base station of the plurality of base stations using the communication configuration.

2. The method of claim 1, wherein the communication configuration further comprises a channel state information (CSI) power offset configuration, a CSI subframe set configuration, a codebook restriction, or any combination thereof.

3. The method of claim 1, wherein the rate matching configuration comprises a starting symbol for physical downlink shared channel (PDSCH) transmissions, an ending symbol for PDSCH transmissions, a multimedia broadcast multicast (MBMS) single frequency network (MBSFN) indication, a cell-specific reference signal (CRS) configuration, one or more non-zero power CSI reference signal (NZP CSI-RS) configurations, or any combination thereof.

4. The method of claim 1, further comprising:
identifying a resource allocation for each of the plurality of base stations based at least in part on the communication configuration, wherein the communicating is based at least in part on the resource allocation.

5. The method of claim 1, further comprising:
identifying a CSI-RS port configuration for the at least one base station based at least in part on the communication configuration; and
transmitting a CSI report to the at least one base station, wherein the CSI report is based on the CSI-RS port configuration and the plurality of base stations.

6. The method of claim 5, wherein the CSI-RS port configuration is based at least in part on a number of receive ports for the UE and a number of transmit ports for the at least one base station.

7. The method of claim 1, further comprising:
generating an individual CSI report for the at least one base station based at least in part on the communication configuration, wherein the communication configuration is based on communication with a single base station; and
transmitting the individual CSI report.

8. The method of claim 1, further comprising:
generating a combined CSI report for each of the plurality of base stations based at least in part on the communication configuration, wherein the communication configuration is based on communication with the plurality of base stations; and
transmitting the combined CSI report for each of the plurality of base stations.

9. The method of claim 1, further comprising:
identifying a special subframe configuration for each of the plurality of base stations based at least in part on the communication configuration, wherein the communicating is based at least in part on the special subframe configuration.

10. The method of claim 9, wherein the special subframe configuration comprises a DMRS pattern, and wherein the communicating is based at least in part on the DMRS pattern.

11. The method of claim 1, wherein the communication configuration comprises an uplink (UL) configuration and a downlink (DL) configuration.

12. The method of claim 1, wherein the communication configuration comprises an enhanced physical downlink control channel (ePDCCH) configuration, and wherein the communicating is based at least in part on the ePDCCH configuration.

13. The method of claim 1, wherein the ePDCCH configuration comprises one or more ePDCCH resource sets associated with the codeword specific configuration.

14. The method of claim 1, wherein the plurality of base stations are coordinated according to a coordinated multipoint (CoMP) configuration that comprises a coordinated beamforming (CBF) mode, a dynamic point selection (DPS) mode, or a joint transmission (JT) mode, and wherein communicating is based at least in part on the CoMP configuration.

15. A method of wireless communication comprising:
transmitting a set of communication configurations associated with a plurality of base stations, wherein a communication configuration of the set of communication configurations is based on a codeword specific configuration comprising a quasicolocation (QCL) indication and a rate matching configuration, wherein the QCL indication indicates that a first set of demodulation reference signal (DMRS) antenna ports associated with a first codeword are quasi-co-located and that the first set of DMRS antenna ports are not quasi-co-located with a second set of DMRS antenna ports associated with a second codeword;
transmitting an indication of the communication configuration from the set of communication configurations; and
communicating with a user equipment using the communication configuration.

16. The method of claim 15, wherein the communication configuration further comprises a CSI power offset configuration, a CSI subframe set configuration, a codebook restriction, or any combination thereof.

17. The method of claim 15, further comprising:
identifying a CSI-RS port configuration based at least in part on the communication configuration; and
receiving a CSI report based on the CSI-RS port configuration and the plurality of base stations.

18. The method of claim 15, further comprising:
receiving a combined CSI report based at least in part on the communication configuration, wherein the communication configuration is based on communication with the plurality of base stations.

19. An apparatus for wireless communication, comprising:
a processor;
memory in electronic communication with the processor; and
instructions stored in the memory and operable, when executed by the processor, to cause the apparatus to:
receive a set of communication configurations associated with a plurality of base stations, wherein a communication configuration of the set of communication configurations comprises a codeword specific configuration comprising a quasicolocation (QCL) indication and a rate matching configuration, and the QCL indication indicates that a first set of demodulation reference signal (DMRS) antenna ports associated with a first codeword are quasi-co-located and that the first set of DMRS antenna ports are not quasi-co-located with a second set of DMRS antenna ports associated with a second codeword;
receive an indication of the communication configuration from the set of communication configurations; and
communicate with at least one base station of the plurality of base stations using the communication configuration.

20. The apparatus of claim 19, wherein the communication configuration further comprises a channel state information (CSI) power offset configuration, a CSI subframe set configuration, a codebook restriction, or any combination thereof.

21. The apparatus of claim 19, wherein the rate matching configuration comprises a starting symbol for physical downlink shared channel (PDSCH) transmissions, an ending symbol for PDSCH transmissions, a multimedia broadcast multicast (MBMS) single frequency network (MBSFN) indication, a cell-specific reference signal (CRS) configuration, one or more non-zero power CSI reference signal (NZP CSI-RS) configurations, or any combination thereof.

22. The apparatus of claim 19, wherein the instructions are operable to cause the processor to:
identify a resource allocation for each of the plurality of base stations based at least in part on the communication configuration, wherein the communicating is based at least in part on the resource allocation.

23. The apparatus of claim 19, wherein the instructions are operable to cause the processor to:
identify a CSI-RS port configuration for the at least one base station based at least in part on the communication configuration; and
transmit a CSI report to the at least one base station, wherein the CSI report is based on the CSI-RS port configuration and the plurality of base stations.

24. The apparatus of claim 23, wherein the CSI-RS port configuration is based at least in part on a number of receive ports for the UE and a number of transmit ports for the at least one base station.

25. The apparatus of claim 19, wherein the instructions are operable to cause the processor to:
generate an individual CSI report for the at least one base station based at least in part on the communication configuration, wherein the communication configuration is based on communication with a single base station; and
transmit the individual CSI report.

26. The apparatus of claim 19, wherein the instructions are operable to cause the processor to:
generate a combined CSI report for each of the plurality of base stations based at least in part on the communication configuration, wherein the communication configuration is based on communication with the plurality of base stations; and
transmit the combined CSI report for each of the plurality of base stations.

27. The apparatus of claim 19, wherein the instructions are operable to cause the processor to:
identify a special subframe configuration for each of the plurality of base stations based at least in part on the communication configuration, wherein the communicating is based at least in part on the special subframe configuration.

28. The apparatus of claim 27, wherein the special subframe configuration comprises a demodulation reference signal (DMRS) pattern, and wherein the communicating is based at least in part on the DMRS pattern.

29. The apparatus of claim 19, wherein the communication configuration comprises an uplink (UL) configuration and a downlink (DL) configuration.

30. An apparatus for wireless communication, comprising:
a processor;
memory in electronic communication with the processor; and
instructions stored in the memory and operable, when executed by the processor, to cause the apparatus to:
transmit a set of communication configurations associated with a plurality of base stations, wherein a communication configuration of the set of communication configurations is based on a codeword specific configuration comprising a quasicolocation (QCL) indication and a rate matching configuration, wherein the QCL indication indicates that a first set of demodulation reference signal (DMRS) antenna ports associated with a first codeword are quasi-co-located and that the first set of DMRS antenna ports are not quasi-co-located with a second set of DMRS antenna ports associated with a second codeword;
transmit an indication of the communication configuration from the set of communication configurations; and
communicate with a user equipment using the communication configuration.

* * * * *